(12) United States Patent
Abou-Elkheir et al.

(10) Patent No.: US 11,184,797 B2
(45) Date of Patent: *Nov. 23, 2021

(54) SYSTEM AND METHOD FOR EFFICIENT USE OF NETWORK BANDWIDTH

(71) Applicant: OHIO STATE INNOVATION FOUNDATION, Columbus, OH (US)

(72) Inventors: Ahmed Abou-Elkheir, Giza (EG); Hesham El Gamal, Columbus, OH (US); Nayer Wanas, Columbus, OH (US); Kareem Youssef, Giza (EG); Hakem Zaid, Giza (EG); John Tadrous, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/871,515

(22) Filed: May 11, 2020

(65) Prior Publication Data

US 2020/0275309 A1 Aug. 27, 2020

Related U.S. Application Data

(63) Continuation of application No. 16/240,293, filed on Jan. 4, 2019, now Pat. No. 10,681,585, which is a
(Continued)

(51) Int. Cl.
*H04W 28/02* (2009.01)
*H04N 21/262* (2011.01)
(Continued)

(52) U.S. Cl.
CPC ......... *H04W 28/0289* (2013.01); *H04L 67/10* (2013.01); *H04L 67/2847* (2013.01);
(Continued)

(58) Field of Classification Search
CPC ........... H04W 28/0289; H04L 67/2847; H04L 67/10; H04N 21/25866; H04N 21/262; H04N 21/41407; G06F 12/0862
See application file for complete search history.

(56) References Cited

U.S. PATENT DOCUMENTS 5,619,274 A 4/1997 Roop et al.
6,243,755 B1 6/2001 Takagi et al.
(Continued)

FOREIGN PATENT DOCUMENTS

CN 101379476 A 3/2009
KR 10-2008-0018013 A 2/2008
(Continued)

OTHER PUBLICATIONS

International Search Report for related International Application No. PCT/US2013/055021; report dated Nov. 28, 2013; (3 pages).
(Continued)

*Primary Examiner* — Vinncelas Louis
(74) *Attorney, Agent, or Firm* — K&L Gates LLP

(57) ABSTRACT

Methods and systems are provided for optimizing the use of network bandwidth by a mobile device. In one embodiment, a system is provided that includes a mobile application client. The mobile application client may log information regarding content requests to a content log and may log network connection statuses for the mobile device. The system may analyze content consumption of a user of the mobile device based on the content log and may create a user profile. The system may also compile a prefetching schedule based on the user profile and the prefetching schedule may be provided to the mobile device. The mobile device may prefetch content at least partially in accordance with the prefetching schedule.

20 Claims, 15 Drawing Sheets

Related U.S. Application Data continuation of application No. 14/421,655, filed as application No. PCT/US2013/055021 on Aug. 14, 2013, now Pat. No. 10,178,580.

(60) Provisional application No. 61/682,828, filed on Aug. 14, 2012.

(51) Int. Cl.
  *H04N 21/258* (2011.01)
  *H04L 29/08* (2006.01)
  *G06F 12/0862* (2016.01)
  *H04N 21/414* (2011.01)

(52) U.S. Cl.
  CPC ..... *H04N 21/25866* (2013.01); *H04N 21/262* (2013.01); *G06F 12/0862* (2013.01); *H04N 21/41407* (2013.01)

(56) References Cited

U.S. PATENT DOCUMENTS

| | | |
|---|---|---|
| 6,324,570 B1 | 11/2001 | Tonchev et al. |
| 6,701,316 B1 | 2/2004 | Li et al. |
| 6,802,064 B1 | 10/2004 | Yao et al. |
| 6,915,221 B2 | 7/2005 | Pehrsson et al. |
| 7,403,994 B1 | 7/2008 | Vogl et al. |
| 7,565,489 B2 | 7/2009 | Mullender et al. |
| 7,716,425 B1 | 5/2010 | Uysal et al. |
| 7,975,025 B1 | 7/2011 | Szabo et al. |
| 8,169,960 B2 | 5/2012 | Bourlas |
| 8,312,229 B2 | 11/2012 | Bloks |
| 8,423,853 B2 | 4/2013 | Bourlas et al. |
| 8,452,745 B2 | 5/2013 | Ramakrishna |
| 9,002,828 B2 | 4/2015 | Fiatal |
| 9,531,522 B2 | 12/2016 | El Gamal et al. |
| 9,680,766 B2 | 6/2017 | El Gamal |
| 2002/0019854 A1 | 2/2002 | Sagi |
| 2003/0126232 A1 | 7/2003 | Mogul et al. |
| 2004/0029591 A1 | 2/2004 | Chapman et al. |
| 2004/0117577 A1 | 6/2004 | Bloks |
| 2005/0032505 A1 | 2/2005 | Himelhoch |
| 2006/0277271 A1 | 12/2006 | Morese et al. |
| 2007/0133603 A1 | 6/2007 | Weaver et al. |
| 2007/0156845 A1 | 7/2007 | Devanneaux et al. |
| 2008/0123520 A1 | 5/2008 | Ji et al. |
| 2008/0242280 A1 | 10/2008 | Shapiro et al. |
| 2009/0248858 A1 | 10/2009 | Sivasubramaniam et al. |
| 2009/0287750 A1 | 11/2009 | Banavar et al. |
| 2010/0172306 A1 | 7/2010 | Gill et al. |
| 2010/0235473 A1 | 9/2010 | Koren et al. |
| 2011/0053513 A1 | 3/2011 | Papakostas |
| 2011/0276766 A1 | 11/2011 | Fullerton et al. |
| 2011/0316723 A1 | 12/2011 | Wohlert et al. |
| 2012/0023570 A1 | 1/2012 | Gorodyansky |
| 2012/0140651 A1 | 6/2012 | Nicoara et al. |
| 2012/0180101 A1 | 7/2012 | Davis et al. |
| 2012/0208471 A1 | 8/2012 | Shima et al. |
| 2013/0149994 A1 | 6/2013 | Goddam et al. |
| 2013/0222515 A1 | 8/2013 | Abuan et al. |
| 2014/0115090 A1 | 4/2014 | Hasek |

FOREIGN PATENT DOCUMENTS

| | | |
|---|---|---|
| KR | 10-2009-0085589 A | 8/2009 |
| KR | 10-2010-0084512 A | 7/2010 |
| WO | 2006/133344 A2 | 12/2006 |
| WO | 2009087549 | 7/2009 |

OTHER PUBLICATIONS

Decision on Rejection and English translation for related Chinese Application No. 201380053678X; action dated Jul. 2, 2019; (15 pages).

Chinese Office Action and English translation for related Chinese Application No. 201380053678X; action dated Mar. 5, 2019; (19 pages).

Chinese Office Action for related Chinese Application No. 201380053678X; action dated Dec. 6, 2019; (4 pages).

Examiner's First Report for related Indian Application No. 1015/CHENP/2015; action dated Jul. 12, 2019; (7 pages).

Chinese Office Action for corresponding Chinese Application No. 201380053678.X; dated Dec. 4, 2017; (10 pages.

Chinese Office Action for corresponding Chinese Application No. 201380053678.X; action dated Oct. 19, 2018; (18 pages).

SYSTEM AND METHOD FOR EFFICIENT USE OF NETWORK BANDWIDTH

CROSS REFERENCE TO RELATED APPLICATIONS

This application is a continuation application of U.S. application Ser. No. 16/240,293, filed on Jan. 4, 2019, which is a continuation application of U.S. Pat. No. 10,178,580, filed on Feb. 13, 2015, which is a 35 U.S.C. Section 371 national stage filing of International Patent Application No. PCT/US2013/055021, filed Aug. 14, 2013, which claims priority to U.S. Provisional Patent Application No. 61/682,828, filed on Aug. 14, 2012, entitled "System and Method for Efficient Use of Bandwidth Based on User Profiles and Other Data." The entire disclosure of the foregoing applications are incorporated by reference herein.

BACKGROUND

There continues to be an ever increasing demand for wireless spectrum resulting from the proliferation of wireless mobile computing devices (e.g., smartphones, tablet computers, etc.) combined with the widespread adoption of throughput hungry applications and services (e.g., video and music services). Mobile broadband (network access via cellular telephone tower and/or satellite link) in particular has become overburdened, especially during certain times of day. Because the available mobile broadband spectrum is non-renewable and limited, this increased demand motivates the need for the more efficient use of network bandwidth.

In addition, most wireless mobile computing devices are capable of accessing two or more distinct wireless networks, such as mobile broadband (e.g., 3G or 4G cellular network) and Wi-Fi (wireless local area network). While mobile broadband access typically provides a significantly broader coverage area, many mobile broadband providers no longer provide unlimited throughput for a set fee and/or may throttle speeds during peak hours or periods of high usage. For example, the monthly fee for mobile broadband may only provide up to 2 GB data traffic, with additional traffic in excess of 2 GB billed at a higher per GB rate. Wi-Fi access, on the other hand, is often available at no cost, or a set fee regardless of bandwidth usage. Thus, many users prefer to use a less expensive network, particularly for large data transfers (e.g., downloading video). Of course users also want to be able to consume desired content (e.g., watch an Internet video) at any time, rather than only when they have Wi-Fi network access. Similarly, mobile broadband providers also desire to better balance network traffic and use their bandwidth more efficiently, while maintaining a high quality of service..

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

Figure 1:
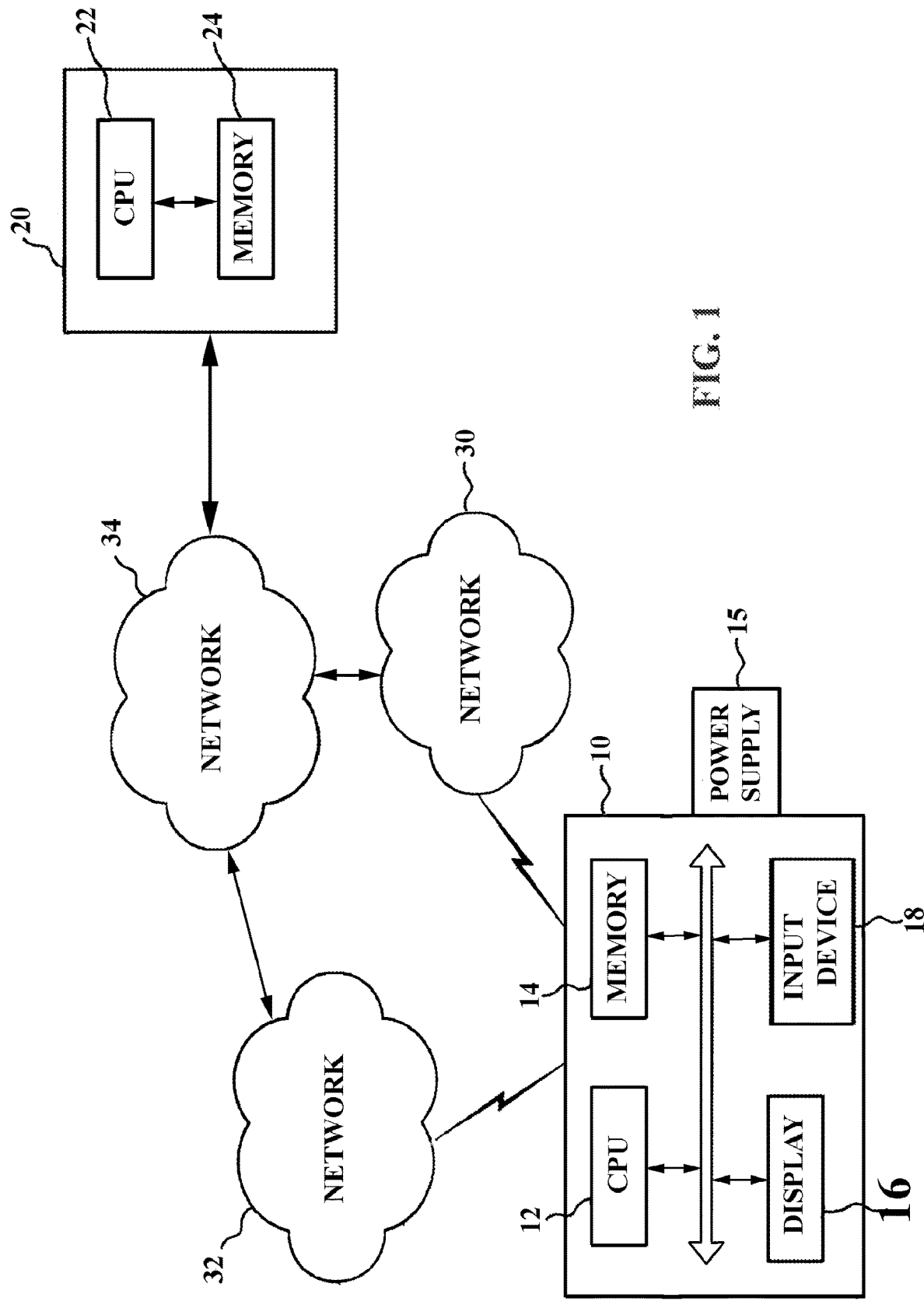
FIG. 1 depicts a block diagram of a predictive, automated, user-centric content loading system and a user's mobile device associated therewith according to one embodiment.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description, which is by way of illustration, one of the best modes contemplated for carrying out the invention. As will be realized, the versions described herein are capable of other different and obvious aspects, all without departing from the invention. For example, although the systems and methods will be described herein in conjunction with a mobile device running the Android® operating system, it will be understood that the systems and methods are not limited to this particular operating system. In addition, although specific content types and their corresponding applications (e.g., YouTube videos), as well as specific social networking sites and platforms (e.g., Facebook) are mentioned in describing the systems and methods, the systems and methods may be configured to be used in connection with any of a variety of other content types, content services, content providers, and associated applications known to those skilled in the art or hereafter developed. Accordingly, the drawings and descriptions should be regarded as illustrative in nature and not restrictive.

The present invention provides systems and methods for the efficient use of network bandwidth based on user profiles and other data. User activity with respect to content requests by a wireless mobile device are monitored in order to construct a content consumption profile for the user. The system then predicts content which the user is likely to request in the future, and, in some embodiments, determines other content which the user is predicted to be interested in receiving. The content is then prefetched and stored in local memory of the user's mobile device for later retrieval and consumption by the user.

The predictive automated user-centric loading the SystemSystem (or platform) described further herein generally comprises, among other things, a client (e.g., software) that resides on an end user's mobile device which connects to a backend server. FIG. 1 depicts a block diagram of one embodiment of the System along with a user's mobile device (10) on which the client software is stored in one or more memories (14) of the mobile device (10). Mobile device (10) is configured to communicate with server (20) (sometimes referred to herein as a Cloud Server) via one or more networks (30, 32, 34). In one embodiment, network (30) comprises a wireless mobile broadband network (e.g., a 3G or 4G cellular network) and network (32) comprises a wireless local area network (Wi-Fi). In the embodiment shown, network (34) comprises the Internet such that networks (30, 32) act as sub-networks linking the mobile device (10) and server (20) to one another and other servers accessible via Internet (34) (e.g., servers storing content a user wishes to access). In other embodiments, networks (30, 32, 34) can be a local area network (LAN), wide area network (WAN), virtual private network (VPN), personal area network (e.g., an ad-hoc network using Bluetooth) or any other means of transferring information between the mobile device (10) and remote server (20).

Mobile device (10) generally comprises a mobile computing device having an internal configuration of hardware including a processor such as a central processing unit, or CPU (12), memory (14), power supply (e.g., a battery) (15), display (16), input device (18) (e.g., a keypad and/or touch screen). The CPU (12) is a controller for controlling the operations of the mobile device (10), and is connected to the memory (14) by, for example, a memory bus. The memory (14) stores, for example, the operating system for the mobile device (10), as well as System software, application software (e.g., "apps"), prefetched content and other data. Memory (14) can be implemented using any type of suitable storage medium including a flash memory device (e.g., an SD-card), a hard disk, random access memory (RAM), static random access memory (SRAM), read-only memory (ROM), electrically erasable programmable read-only memory (EEPROM), programmable read-only memory (PROM), magnetic memory, magnetic disk, optical disk, and other types of memory known to those skilled in the art or hereafter developed. Mobile device (10) may include more than one memory (14), which may be the same or different, and one or more of memories (14) may be set aside for a variety of purposes, such as a portion of memory (14) reserved for cache storage.

In some embodiments, mobile device (10) comprises a mobile phone (e.g., a smartphone), a tablet computer, a notebook computer, a PDA, a laptop computer or other mobile device providing similar functionality. Mobile device (10) may include other features and components typically found in smartphones and tablet computers such as network interfaces, a location detection device such as a GPS receiver, speakers, ports and the like. Display (16) can present an image or video (e.g., for consumption by a user), and can be implemented in various ways, including, for example, a liquid crystal display (LCD).

Networks (30, 32, 34) connect the mobile device (10) and remote server (20), as well as connect mobile device (10) to various other remote content providers (e.g., YouTube, Internet websites, etc.). Remote server (20) can be, for example, a computer having an internal configuration of hardware including a processor such as a central processing unit (CPU) (22) and a memory (24). The CPU (22) can be a controller for controlling the operations of the server (20). The CPU (22) is connected to the memory (24) by, for example, a memory bus. The memory (24) can be random access memory (RAM) or any other suitable memory device. The memory (24) can store data and program instructions which are used by the CPU (22). Other suitable implementations are possible, as the term "server" is intended to broadly encompass any computerized component(s), system(s) or entities, regardless of form, which is adapted to provide data, files, applications, content, or other services to one or more other devices or entities on a computer network. For example, in some embodiments the processing and data functions of the remote server (20) can be distributed among multiple servers which comprise portions of the same computing device and/or portions of two or more separate computing devices (e.g., physically separate servers for performing different functions identified herein for remote server (20)).

As detailed in the following description, the System analyses content consumed by the user and from it predicts what the user will be likely to request in the near future. "Content" can be any form of information accessible to the mobile device (12) over networks (30, 32, 24), such as video, music, other audio files, websites, news, sports scores, and other forms of information available over the network(s), particularly information accessible over Internet (34) from various content and information providers. The System also monitors the user's mobility and wireless connectivity patterns (e.g., Wi-Fi and roaming), and from this builds a profile for the user's wireless connectivity (including the characteristics of the different networks the user has access to). In addition, the System profiles the different content categories consumed by the user, based on their dynamic rate, as well as the usage of the data plan by the user's mobile device. These profiles are used to determine when predicted content will be pushed to the mobile device in order to guarantee the highest quality of service and the best utilization of the available network resources. In certain embodiments, the System offloads traffic from peak to off-peak times within a particular network while in other embodiments, the System will offload the traffic from costly long distance networks (e.g., 3G networks) to more affordable short distance networks (e.g., Wi-Fi and peer-to-peer, or "P2P").

In some embodiments of the System, the user has the ability to control certain parameters of the scheduling framework as allowed by the dynamic setting feature provided via a user interface (e.g., on the mobile device). This user interface puts the user in control of the mobile data usage by offering customized reports, personalized alerts, and sophisticated management tools, while the System performs its functions in the background. In some instances, the System continually updates the user on the achieved cost-savings.

Using the various user profiles and user-consumed content, and, in some embodiments the profiles and consumption patterns of other users, the System, specifically Cloud Server (20), creates a content schedule unique to each user. In one embodiment, the content schedule identifies content which the System predicts the user will request in the future, as well as the anticipated time the user will request such content. The content schedule is provided to the mobile device, updated periodically. The mobile device utilizes the content schedule and prefetches content for storage in cache memory of the device. Cached content is stored, for example, in a reserved block of memory (14), or in other memory provided in mobile device (12) such as an SD-card or other form of FLASH memory. The content schedule, however, is not a strict hour-by-hour or minute-by-minute set of instructions blindly followed by the mobile device. Rather, the content schedule is symbolic, acting more as a scheduling guideline, with the mobile device, specifically the mobile device app of the System, adjusting the prefetching of content to real time conditions such as type of network access (e.g., Wi-Fi vs. 3G), battery status, etc.

The cached content, prefetched via the System, can be consumed either through the user interface of an associated application for that type of content (e.g., a Facebook or YouTube app on the mobile device), or through the System's user interface provided on the mobile device. In some embodiments, the content schedule also includes content which the System recommends to a user, based on, for example, the user's profiles and past content consumption. This recommendation engine is jointly optimized with the prediction and caching modules to offer the best performance. The System architecture also allows for integrating compression at the application layer, and hence, combines the bandwidth savings offered by personalized caching with that resulting from efficient compression of multimedia content.

The System is based on the following observations:
1. The mismatch between supply, in terms of the bandwidth capacity of mobile broadband networks, and demand, in terms of the traffic that needs to be supported. This mismatch is caused by the peak demand rather than the average one. In a typical setting, the peak-to-average demand ratio can be as high as an order of magnitude.
2. The dominant traffic leading to the bandwidth crunch is delay tolerant data traffic. Existing network architectures, however, fail to leverage the delay tolerance characteristic as they are optimized for real time traffic. For example, while most multimedia content consumed by user's for entertainment was, in most instances, created long before the user desires to consume it, networks treats each multimedia content request as a real time request to be delivered over the network at the moment the user clicks to watch it.
3. Recent studies have established that mobile device usage is predictable, to a large degree. This predictability includes user interests in different categories of multimedia content, mobility patterns which determine daily accessibility to different mobile networks (e.g., Wi-Fi, 3G femtocells, etc . . . ), a user's usage of their data plan over a monthly cycle, and the utilization of the mobile device resources (e.g., battery, memory, and processing power).
4. The capabilities of the mobile devices, in terms of memory and processing power, continue to follow Moore's law; i.e., doubling every 18 months. In addition, recent advances in cloud computing have resulted in an unprecedented amount of computing resources being made available for enhancing performance of different cyber applications, conditioned on the utilization of efficient algorithmic approaches. One can now pose the question:

Embodiments of the Systems and methods described herein overcome bandwidth challenges, at the mobile device and/or network level, by exploiting the predictability of user behavior to enable efficient delivery of digital multimedia content to end users via the most affordable delivery method at the optimal time. As detailed further herein, this paradigm allows the consumer to enjoy a personalized mobile Internet experience, with the highest possible Quality of Service (QoS) and the least expenditure of network resources and at the lowest price.

The System generally comprises the following three steps: prediction, scheduling and (in some embodiments) recommending. These steps lead to traffic smoothing (e.g., a reduction in the peak-to-average demand ratio), smart offloading of traffic to networks which are less expensive and/or have greater unused capacity, reduced delay experienced by users (e.g., no buffering required for prefetched content), and reduced monthly costs to users (e.g., reduced data plan overage charges).

1. Predict: The System compiles one or more profiles for each user based on past behavior that models user's interest in content (e.g., categories, genres, content types, etc.), mobility pattern determining access to different mobile networks, usage of mobile device (e.g., battery consumption, memory and processing power usage), and the user's pattern of consuming any applicable monthly data plans. Similarly, the System builds profiles for different content types in terms of their refresh rate (e.g., news ticker has a faster refresh rate than music videos) and the different mobile networks in terms of their throughput and congestion characteristics.

2. Schedule: The profiles developed in Step 1 are utilized to schedule content caching on the user's mobile device at the optimal time. The scheduling algorithm is constructed based on a multi-objective optimization criteria that: a) enhances user experience by avoiding intolerable delays experienced with real time delivery of content (e.g., buffering delays); b) alleviates congestions suffered by almost all major mobile networks by offloading peak traffic to off-peak times and less congested networks Wi-Fi); c) lowers the cost incurred by end users by prefetching most of their throughput-hungry content from more affordable networks (e.g., Wi-Fi and Peer-to-Peer (P2P)); and d) optimizing usage resources of the mobile device in terms of battery, memory, and processing power.

3. Recommend: The third step of some embodiments is the use of a recommendation engine that offers incentives in the form of suggested content to users to consume locally cached content, and as a result, reduces the peak demand in mobile networks. This recommendation system is optimized based on, for example, the billing system of the user's mobile broadband network along with the user's preferences and economic requirements.

These three steps are tightly inter-related and form the basic building blocks of the System described herein. The joint optimization of the engines executing the three steps above leads to the construction of a scalable solution addressing the bandwidth crunch in different environments (based on the available mobile networks and mobile device capability). For example, by jointly optimizing the prediction algorithm and recommendation system design, one will achieve a much higher hit ratio, and hence, minimize the probability of downloading content that will not be consumed by the user. The basic principle which enables this joint optimization is the decomposition of user behavior into: (1) a structured component that can be identified from past behavior and captured in the user profile; and (2) an arbitrary component that can be influenced by the recommendation system. For example, in absence of the recommendation system, the prediction algorithm must bear the responsibility of figuring out exactly the content that will be requested by the user of any specific type. On the other hand, a carefully constructed recommendation system will render it sufficient for the prediction algorithm to identify the category (or genre) of interest to the user, download an item within this class, and then recommend this item to the user. If this item is close enough to the user's interest, the user will have a strong incentive to consume it instead of asking for real time content from the more expensive network since delays and congestions associated with real time transmission are avoided, and this cached content will correspond to lower cost for the user (since pre-fetching typically happens using less expensive mobile network).

Figure 2:
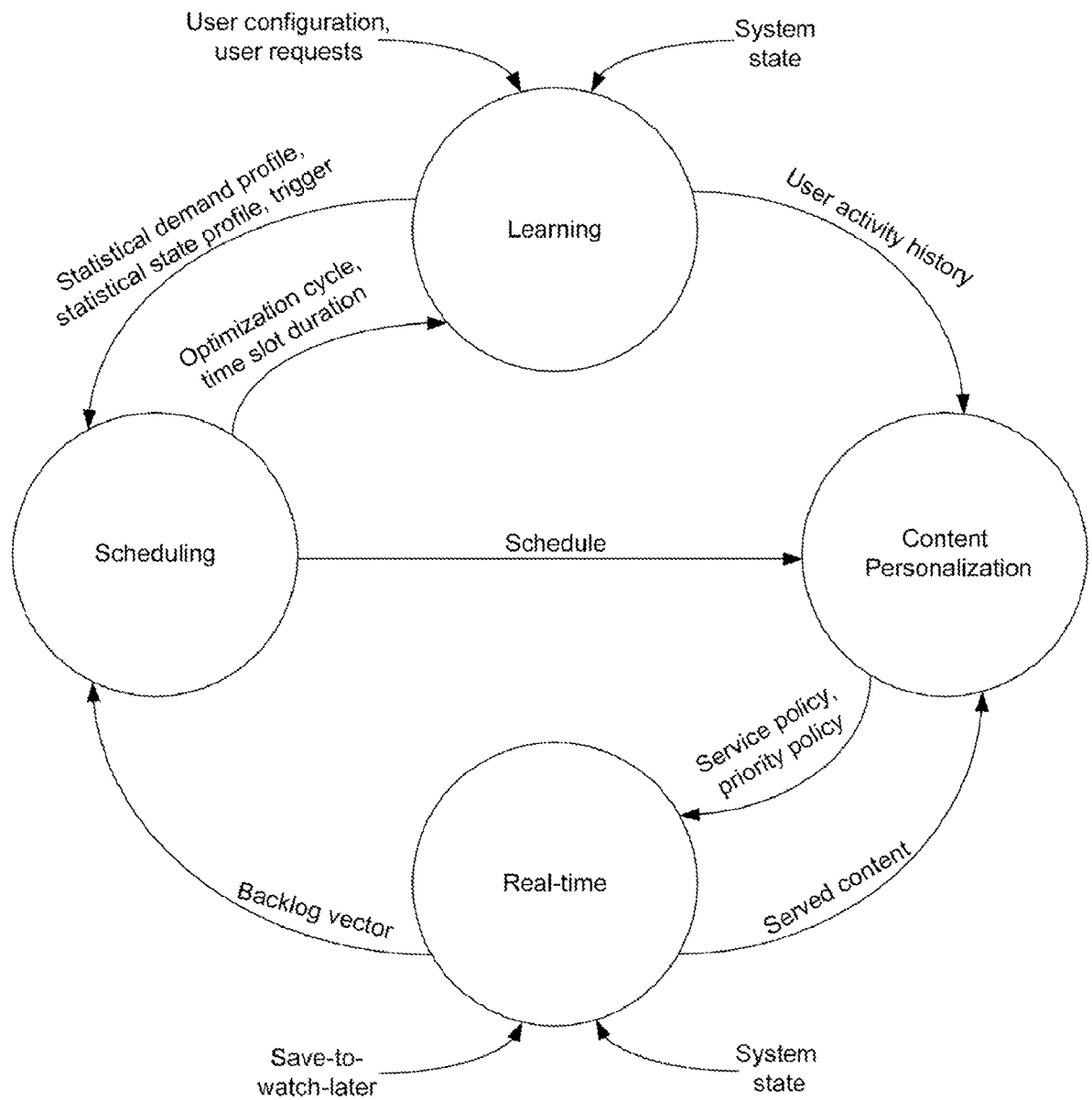
FIG. 2 depicts a high-level overview of the four components of the System and their interaction and interrelationships.

The System observes and learns from a multitude of parameters such as, users' preferences and activities, WiFi availability patterns, economical responsiveness, location, battery level, 3G rates, etc., and carries out optimization over a considerably wide set of variables (including an enormous number of dynamically changing content items). Thus, the design of the System is broken down into a group of interacting components (or modules). The four main components are learning, scheduling, content personalization, and real-time modules. FIG.2 depicts a high-level overview of these four components (or modules) and their interaction and interrelationships. In some embodiments, certain of these four components are elements of the Cloud Server (20), while others are elements of the mobile device (10). In still further embodiments portions of one or more of the four components are elements of the Cloud Server (20), while other portions are elements of the mobile device (10) (e.g., some of the Learning Component is on the Cloud Server (20), and some is on the mobile device (10) (e.g., programmed as part of the mobile device application).

Learning Module: represents the ultimate source of information for the entire system. It includes the following functionalities:
1. Constructs models for relevant parameters to be used by the other modules, including, but not limited to, user demand, network state, and battery dynamics.
2. Allows for interactive user input and generates adaptive user interaction to enhance the user recognition of his own preferences, and enables manual configuration of several parameters, including but not limited to Wi-Fi availability, content preferences, and activity times.
3. Triggers the scheduling component if a considerable deviation from the models is detected.

Figure 3:
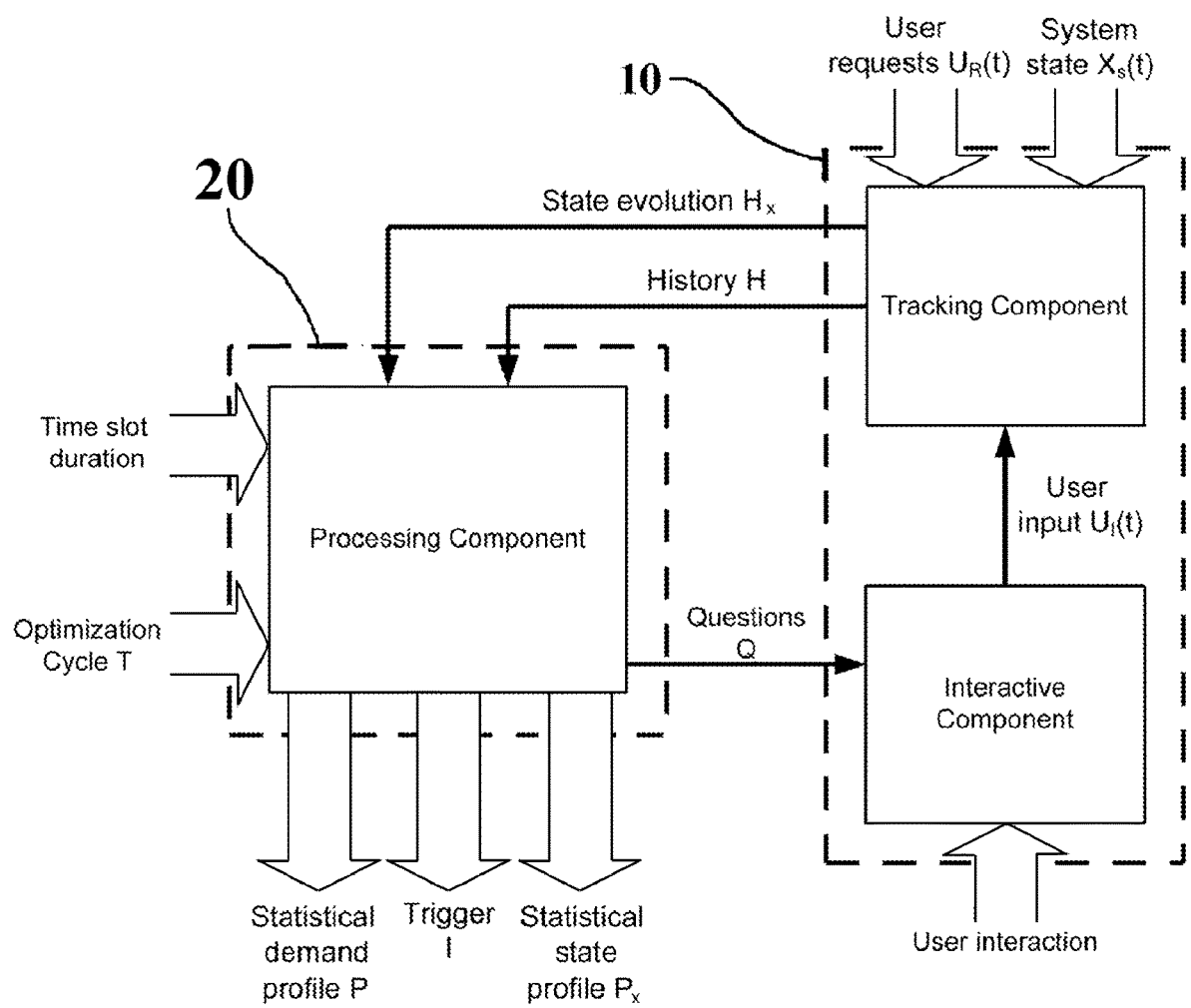
FIG. 3 depicts a high-level overview of the three components constituting the Learning Module, and their interaction.

The Learning Module comprises three main components: tracking, interactive, and processing:
a) Interactive Component: constitutes the ultimate interface with the user. It is responsible for collecting the user configuration and settings, dynamically receiving and displaying user interaction, and unifying user data.
b) Tracking Component: is the information gathering center on the mobile device.
c) Processing Component: carries out appropriate analysis and processing on the collected data. FIG. 3 is a high-level overview of the three components constituting the Learning Module, and their interactions.

System State: quantifies the network conditions as well as the battery level at every time slot t. The state of the system at time t is denoted by , $X_S(t)$, a 3-dimensional vector with entries (WS(t), GS(t), B(t)) that are described as follows.

Optimization Cycle: is a number T of time slots defining the operational timescale for the back-end server. This period is determined by the scheduling module, and varies from one user to another.

Trigger: is a signal generated by the learning module to indicate a reschedule instruction. Trigger is denoted by $I \in \{0,1\}$.

User Activity History: is a collection of information gathered about the user over the previous optimization cycle. Essentially, the user activity history is used by the learning module to construct the statistical demand profile, and by the content personalization module to optimize the proactive downloads. It is denoted by $\mathcal{H}$, with $\mathcal{H} = \{U_I(t), U_R(t), 0 \leq t \leq T-1\}$.

State Evolution: is the history of the state realizations over the past optimization cycle, with notation $\mathcal{H}_X = \{x_3(t), 0 \leq t \leq T-1\}$.

Priority Policy: determines the significance of each content to be downloaded. Typically, it is diminishing over time, with a factor that depends on the respective data source. For example, rapidly changing content such as Facebook updates may be assigned fast decaying priorities, whereas static YouTube content may receive heavy-tailed priorities. This policy is set by the content personalization module. Notation $\pi$ describes the priority policy, which is an M—dimensional vector with entry m corresponds to the decay rule for data source m.

Service Policy: is the updated schedule with the exact personalized content. While the schedule 11-provides the allowable data units to be preloaded from each data source, the service policy decides on the specific content which best-fits the user's interests. The service policy is denoted by $v = (v(x_3, t))_{t=0}^{T-1}$, with $v(x_3, t)$ is the set of video ID's to be downloaded in time slot t, under state $x_3$ Save-to-watch-later: is a function implemented by PAUL to allow users to input specific video content they want to watch in future. This function is enabled by the real-time module, whereby the user can enter the selected videos and set deadlines by which the videos have to be delivered. Notation SD(t) represents the set of save-to-watch-later videos, and their associate deadlines, at time slot t. Note that the user requests $U_R(t)$ differ from SD (t) in the following sense: $U_R(t)$ are the videos that the user requests to watch at time t, whereas SD (t) are what the user wants to download in order to watch in future. Hence, not all SD (t) are watched in future.

Scheduling Module: constructs a schedule for the next optimization cycle. It tells how much data should be preloaded from each of the content sources and at/by which time content should be pulled by the mobile device (assuming other conditions are met, such as connectivity, memory space, battery level, etc.). The inherent design objective is to minimize the data delivery cost, including the price paid, the QoS impairments, the freshness of the preloaded content, and the battery consumption. It includes the following functionalities:
1. With the available information about the future dynamics the scheduler decides on a proactive download amount from each content source (e.g., YouTube, Facebook, etc.), and over an optimization cycle (e.g., one day, a 12-hour cycle, an 8-hour cycle, etc.). The scheduler minimizes the expected cost for future data retrievals.

2. The scheduler responds to triggers from the learning module to carry out a new cycle of scheduling.

Content Personalization Module: is concerned with the optimization of the scheduled data to best match the user's preferences and interests. Its underlying design objective is to maximize the probability that the preloaded content is actually requested by the user. It includes the following functionalities:
1. While the schedule received from the scheduling module does not specify the exact content to be fetched, content personalization module needs to carefully spread the allowable amount of data (e.g., a predetermined amount per user based on past consumption, or a user-set preference) over a number of content items that lay reasonably accurate within the user's interests. Such a design requires sufficient knowledge about the nature of each application/data source as well as the user's trends.
2. It generates a priority policy to be implemented by the real-time module so as to handle backlogs and facilitate a stable operation.
3. It tracks and possibly reschedules backlogged content items from the previous optimization cycle. In particular, it receives a set of served content from the real-time module, and hence deduces the un-served ones.
4. It categorizes, itemizes, and assigns ID's to the content items from all supported applications.

Figure 4:
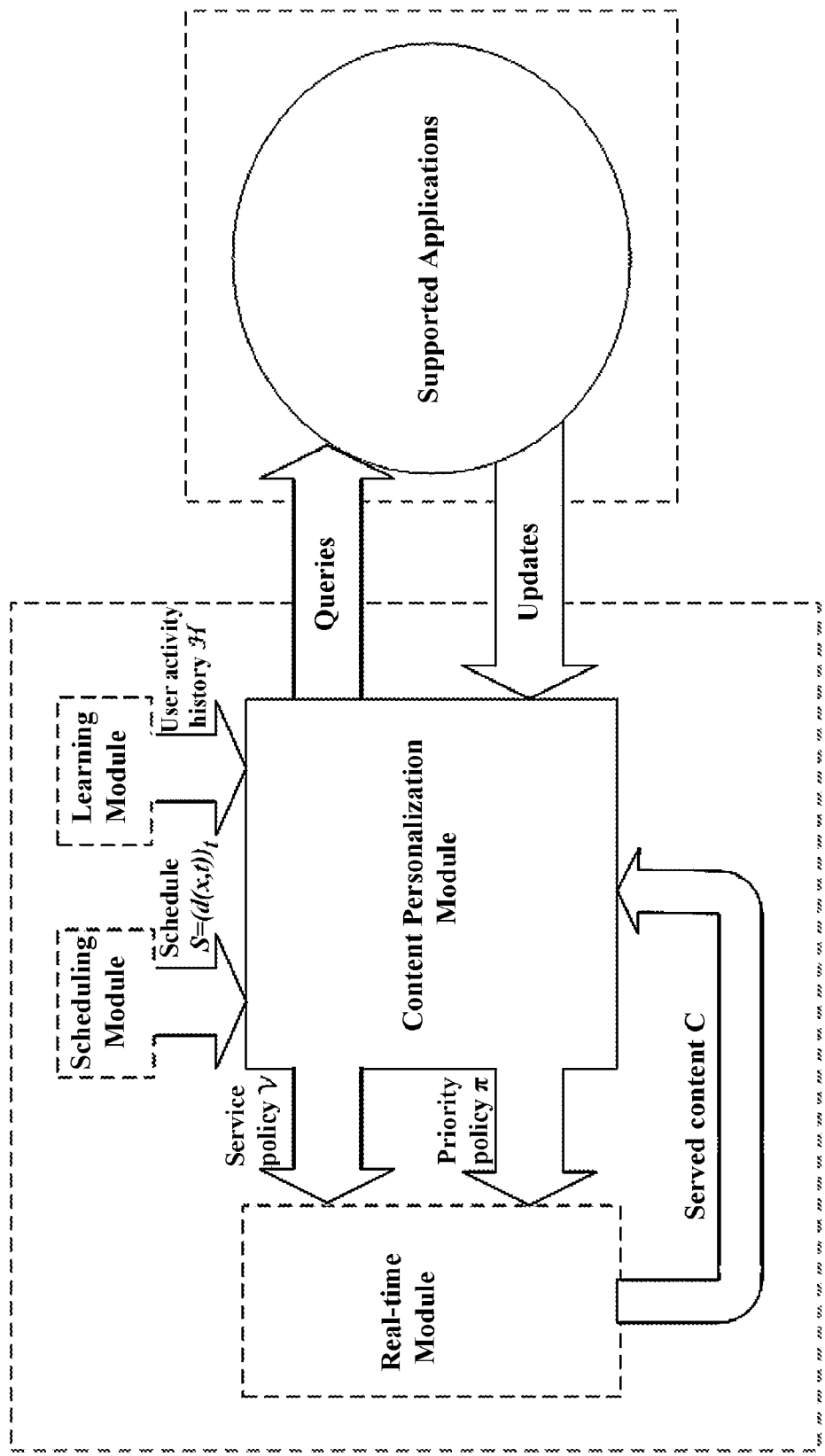
FIG. 4 depicts the primary interactions between the content personalization module and the other modules, as well with the supported applications.

FIG. 4 depicts the primary interactions between the content personalization module and the other modules, as well with the supported applications.

Real-time Module: executes the service policy generated by the content personalization module together with the priority policy, and reports the backlog and served data to the respective modules. Also, it allows for save-to-watch-later function whereby the user can specify content elements to watch at a later time. It includes the following functionality:
1. It observes the system state, and applies the service policy with the associate priorities.
2. It reports the served content to the content personalization module, and the backlog data amounts to the scheduling module.

The scheduling, content prediction and content recommendation modules are compiled based on various acquired data. Content prediction, for example, is based on the types, category, genre and, in some instances, predetermined channels (e.g., a user's YouTube channel) or user accounts (e.g., a user's Facebook account). The algorithms not only are multi-objective optimizations of various parameters, in some embodiments they are adaptive (i.e., they adapt, or learn, based on ongoing user consumption patterns of prefetched data.

By way of one example, the scheduling algorithm can be configured to adapt based on several performance aspects, including hit-ratio dynamics, user connectivity patterns, consumption rates, efficiency of data delivery, user preferences, etc. A learning component monitors the user behavior and response throughout the past interactions, and supplies the scheduler with sufficient statistical information to carry out an adaptive allocation of proactive downloads. Further, the learning component utilizes a dynamic notification mechanism which consistently sends questions/notifications to the users in accordance with their behavior in the past.

The adaptive allocation of proactive downloads dynamically adjusts the number of scheduled content items (e.g., videos) from each application (e.g., Youtube, Facebook, etc.) depending on changing user activities, and preferences. It operates at a faster time scale, typically on a daily basis, and improves the hit-ratio performance through an increasing number of downloads from the applications attaining higher hit-ratio, and reducing the number of videos from unused applications. The hit-ratio is simply percentage of prefetched, predicted content which a user later requests for consumption.

With connection to the modular design terminologies, the following quantities are adopted:

Data sources: The data source will be represented by an application. Given a total of M applications, the notation $m(d)$ is used to denote the set of preferred applications on day d.

Optimization cycle: is taken to be one day of length T time slots.

Data Unit: is one video (or other content item).

Proactive download vector: of the day d+1 is denoted by $S(d+1)=(S_i(d+1))_{i \in m(d+1)}$, where $S_i(d+1)$ is the number of videos scheduled from application i on day d+1. This number is decomposed to $S_i(d+1)=C_i(d+1)+\sigma_i(d+1)$, where $C_i(d+1)$ is the number of videos scheduled by the existing schedule according to the user preferences, and will primarily act as the governing large time-scale dynamics. On the other hand, $\sigma_i(d+1)$ is the adaptively adjusted increment or decrement to $C_i(d+1)$ which covers the faster daily dynamics. The number $C_i(d+1)$ can only be non-negative, whereas $\sigma_i(d+1)$ can take on negative values. Nevertheless, the quantity $S_i(d+1)$ is always non-negative. That is, we should always have:

$$S_i(d+1)=\max\{0, C_i(d+1)+\sigma_i(d+1)\}, i \in m(d+1).$$

Load vector: is captured through the parameter $\lambda_i(d)$ which is the number of consumed videos from application i on day d.

Served content: or delivered data on day d for application a is denoted by $D_i(d)$, $i \in m(d)$.

User activity history: will keep track of the load vector over the past $d_h$ days. Also, it will contain information about the last day on which the user updated a certain setting. Specifically, $U_p$ is the last day the user updated the preferences/frequencies, $U_c(i)$, is the last day the user updated the categories of application i.

Moreover, in the internal memory of the server, the following quantities need to be kept track of. (1) the last day a question about preferences has been asked to the user, denote it by $L_p$ (2) the last day a question about categories update for application i, if any, has been asked to the user, denote this by $L_c(i)$. (3) the last day a question about authentication for application if any, has been asked to the user, denote it by $L_A(i)$.

Learning Module Responsibilities. The learning module is required to process the daily logs of aforementioned quantities and produce the following statistics, and pass them to the scheduler, in addition to applying a smart notification procedure so as to enhance the user experience.

Statistical Measures. The average hit ratio over the last $d_h$ days[1]. This is denoted by $\Gamma(d)$ and calculated as $$\Gamma(d) = \frac{\sum_{\delta=d-d_h+1}^{d} \sum_{i \in m(\delta)} \lambda_i(\delta)}{\sum_{\delta=d-d_h+1}^{d} \sum_{i \in m(\delta)} D_i(\delta)}, \quad (1)$$

The average hit ratio of application over the last $d_h$ days.[1] This is denoted by $\sigma_i(d)$ and calculated as

[1] Current day is denoted by d.

$$\Gamma(d) = \frac{\sum_{\delta=d-d_h+1}^{d} \lambda_i(\delta)}{\sum_{\delta=d-d_h+1}^{d} D_i(\delta)}, i \in m(d). \quad (2)$$

The hit ratio of the current day d over all preferred applications. This is denoted by $\gamma(d)$ and calculated as $$\gamma(d) = \frac{\sum_{(i \in m(d))} \lambda_i(d)}{\sum_{i \in m(d)} D_i(d)}, \quad (3)$$

The hit ratio of application t for the current day d. This is denoted by $\gamma_i(d)$ and calculated as $$\gamma_t(d) = \frac{\lambda_i(d)}{D_i(d)}, i \in m(d). \quad (4)$$

Notification. Notifications are sent to the user based on his average activities and behavior. The procedure sends three types of notifications. First, a preference/frequency update notification which is to be sent over long periods of time since the dynamics of preference change are essentially slow. A notification can be sent if $d_p$ has passed since the user updated the preferences. When a preference notification is sent, the user can either respond, or ignore it. In either case, after a notification is sent the user is given an extra $d_p$ days without preference notification being sent. Second, an authentication/log in notification that needs to be sent if the user prefers an application which requires the user authentication. We use the set $A^c(d)$ to denote all the applications preferred by the user on day d and require his authentication, yet he has not logged in. A number of days $d_A$ has to separate any two authentication notifications targeting the same application.

Figure 13:
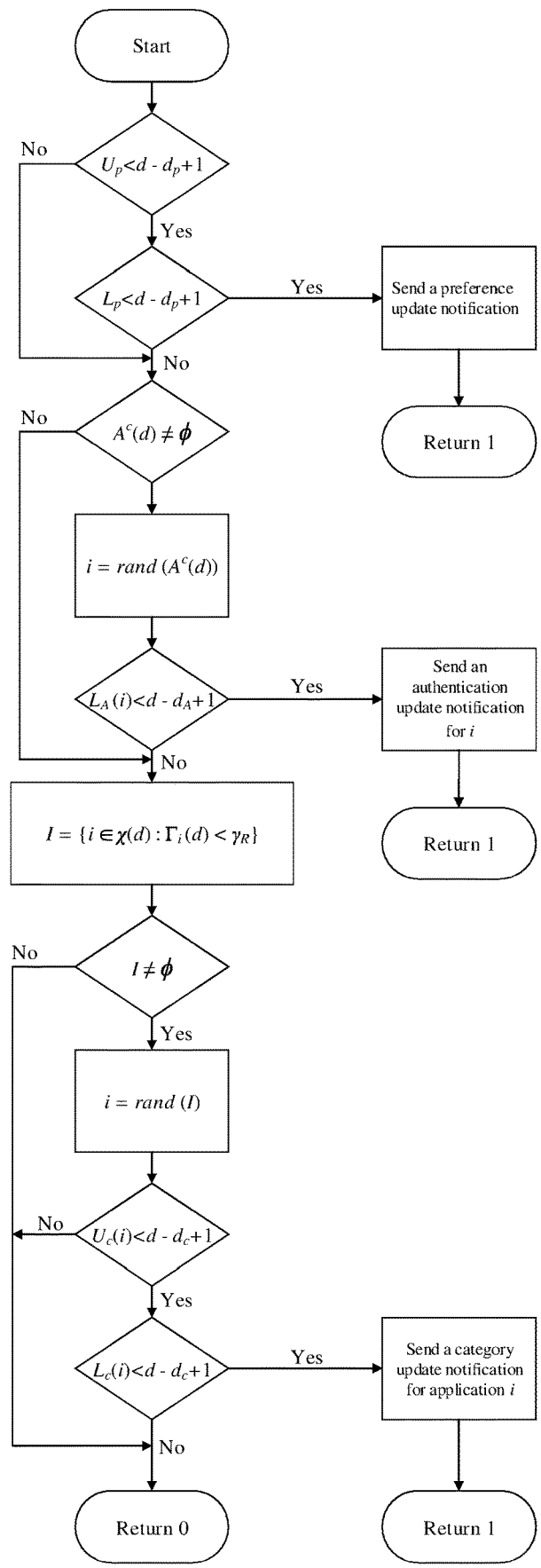
FIG. 13 depicts a flowchart of the notification procedure implemented by the learning module.

Third, a category update notification. This type is sent to inquire about category preference for some application, usually experiencing a low hit ratio, on average. The set $\chi(d)$ consists of all applications preferred by the user on day L and allow for category selection. Yet the set I comprises those in $\chi(d)$ with low hit ratio, on average. The category selection by the user is assumed to be valid for $d_c$ days after which the user can be notified for category update. A duration of $d_c$ days is recommended to separate any two category update questions targeting the same application. FIG. 1 demonstrates a flowchart of the notification procedure. Note that, the notification procedure returns 1 if it successfully manages to send a notification, and 0 otherwise. FIG. 13 depicts a flowchart of the notification procedure implemented by the learning module.

Scheduling Module Responsibilities. The schedule will operate over two time-scales: the first one is large, typically order of weeks, or possibly months, and concerns the long-term preferences of the user. The operation of this time scale is determined by the existing scheduling algorithm which relies on the input user preferences and maximum number of videos per day to assign corresponding peaks and download strategy. We refer to the output of this schedule for application i by $C_i(d+1)$ as mentioned in the previous section. The second time scale is shorter, operates on a daily basis and dynamically adjusts a value $\sigma_i(d+1)$ based on the daily and short-term averaged activities of the user. For day d+1, the scheduler initially sets $$\sigma_i(d+1) = \sigma_i(d), i \in m(d+1),$$

then possibly changes $\sigma_i(d+1)$ for some applications depending on the user's behavior. Further, it is responsible for checking and sending appropriate notifications to improve its long term performance.

Figure 14:
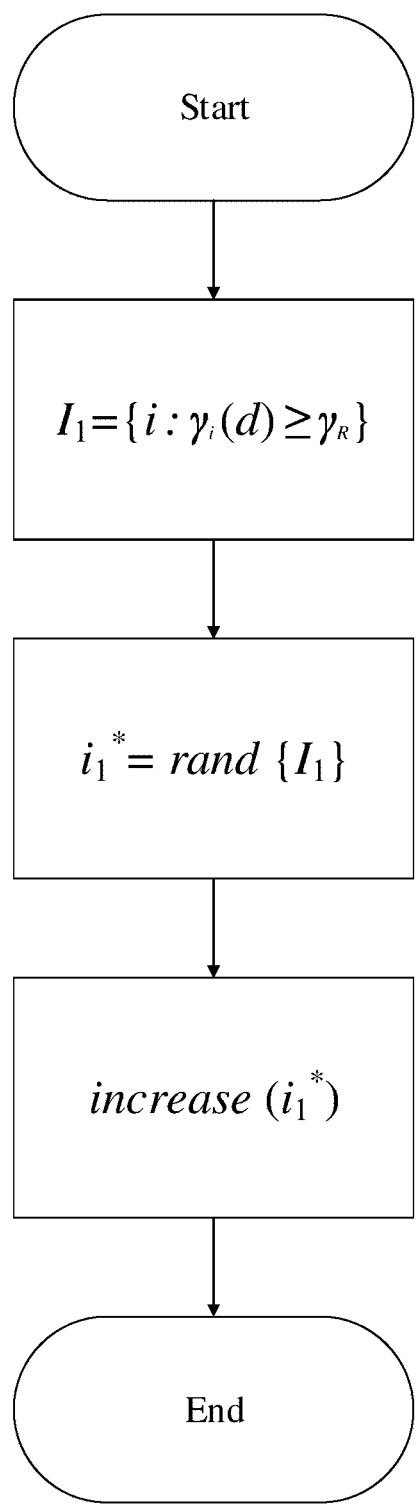
FIG. 14 depicts a flowchart displaying the adjustment of the number of videos for a user with hit ratio $\Gamma(d) \geq \gamma_R$.

The focus herein is on the short time scale (or adaptive) part of the algorithm since the large time scale is already implemented. The operation is of scheduler is based on segmenting the users based on their hit-ratios using thresholds $\gamma_L$ and $g_R$, where $\gamma_L < \gamma_R$, First segment: $\sigma(d) \geq \gamma_R$ This user has a high average hit ratio, potentially likes the service, and can consume more videos. The scheduler thus selects one application with high hit ratio, and increases the number of videos for it by at most 1, and keeps the rest unchanged. FIG. 2 depicts a flowchart of adjusting the number of videos for a user in the first segment. The function rand (I) selects a random element from set I according to a uniform distribution. The procedure increase (i) is responsible for raising the number of scheduled videos from application i by at most one at a time, and is discussed below. FIG. 14 depicts a flowchart displaying the adjustment of the number of videos for a user with hit ratio $\Gamma(d) \geq \gamma_R$.

Figure 15:
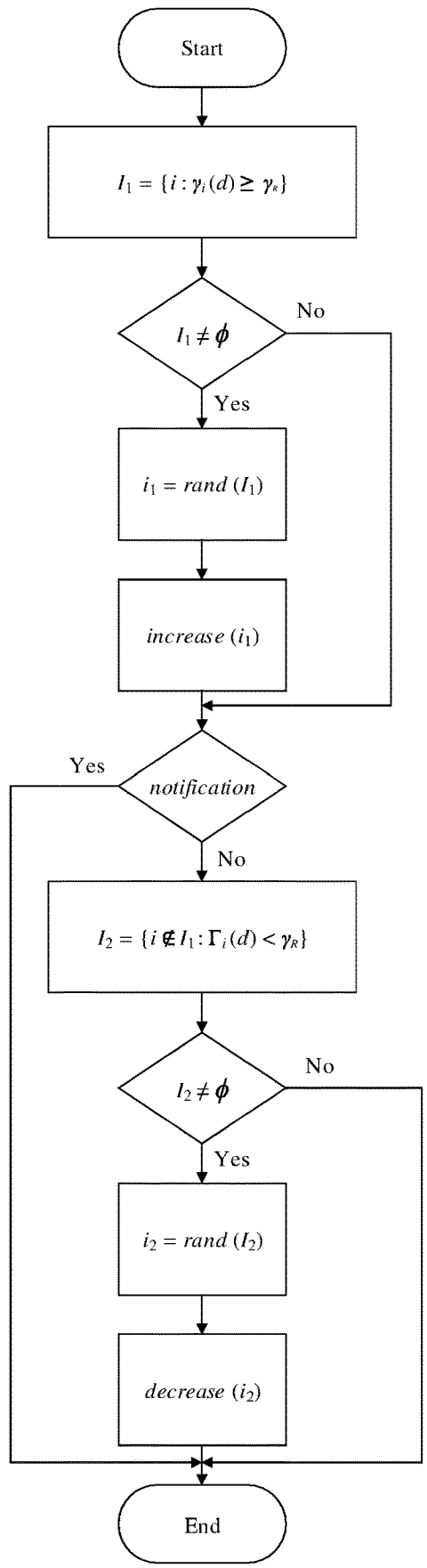
FIG. 15 depicts a flowchart displaying the adjustment of the number of videos for a user with hit ratio $\gamma_L \leq \Gamma(d) < \gamma_R$.

Second segment: $\gamma_L \leq \Gamma(d) < \gamma_R$. The user belonging to this segment is most likely enjoying good service for at least one application, yet other applications are essentially not performing well enough. Thus, the scheduler needs to figure out the problem with the low hit ratio applications and work on solving them appropriately. Moreover, well performing applications, i.e., those with high daily hit ratio, can be rewarded by extra downloads. The flowchart shown in FIG. 3 displays the adaptive operation of the scheduler for a user in the second segment. The procedure decrease (i) is responsible for reducing the number of scheduled videos from application by at most one at a time, and is presented below. FIG. 15 depicts a flowchart displaying the adjustment of the number of videos for a user with hit ratio $\gamma_L \leq \Gamma(d) < \gamma_R$.

Figure 16:
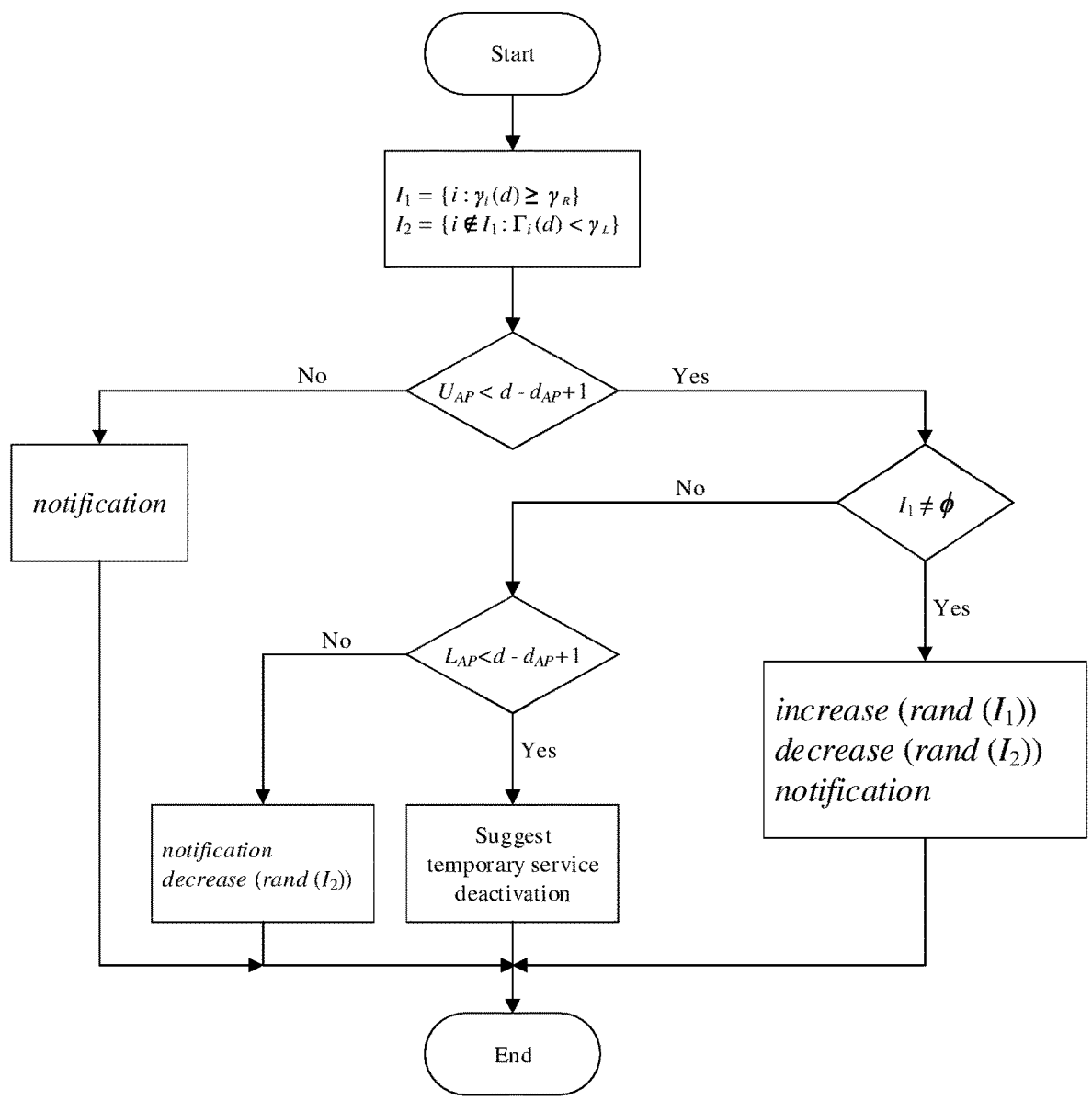
FIG. 16 is a flowchart illustrating the operation of the schedule for the third-segment users.

Third segment: $\Gamma(d) < \gamma_L$. Belonging to this segments are users who potentially gave up the application, or undergoing exceptional events affecting their activity, such as traveling. For this segment, the scheduler should carefully distinguish between different users depending on their activities. For example, users with exceptional inactivity can be suggested to temporarily deactivate the proactive service. Moreover, users who have just activated the service after a deactivation period need to be granted a window of days so that sufficient statistics about their behavior can be drawn. On the other hand, users who forgot about the application, and do not respond to notifications or service deactivation suggestions are more susceptible to decreasing the number of videos so as to both: reduce the burden on their device, and enhance the utilization of the back-end server. The flowchart presented in FIG. 16 illustrates the operation of the scheduler for the third-segment users.

After constructing sets $I_1$ and $I_2$, the algorithm checks $U_{AP}$ which is the last day on which the user has allowed the proactive download service, allow preloading (AP). If that update is recent, i.e., no more than $d_{AP}$ days have passed, then the user is considered as a returning user and is given $d_{AP}$ days to converge to a consistent behavior. Nevertheless, notification procedure takes place during this period in order to facilitate faster convergence.

Conversely, if the last allow-preloading update is not recent, i.e., more than dAP days have passed, then the scheduler tries to distinguish between three cases:

Case 1: The user is fine with at least one application, yet he does not care about others.
Case 2: The user is exceptionally undergoing some circumstances reducing his activity.
Case 3: The user has discarded the application despite of the several notification and service deactivation suggestions.

The first case is captured by the condition that $I_1 \neq \phi$, and the applications witnessing high daily hit ratio are eligible for increase, other applications receive a decrease and a notification is sent to improve the learning. The second case is quantified by the condition that $I_1 = \phi$ and no "suggestion of service deactivation" has been sent to him over the past $d_{AP}$ days, thus such a suggestion needs to be sent. Finally, the third case is neither the first nor the second, hence one applications receives a decrease, and a notification is sent.

Figure 17:
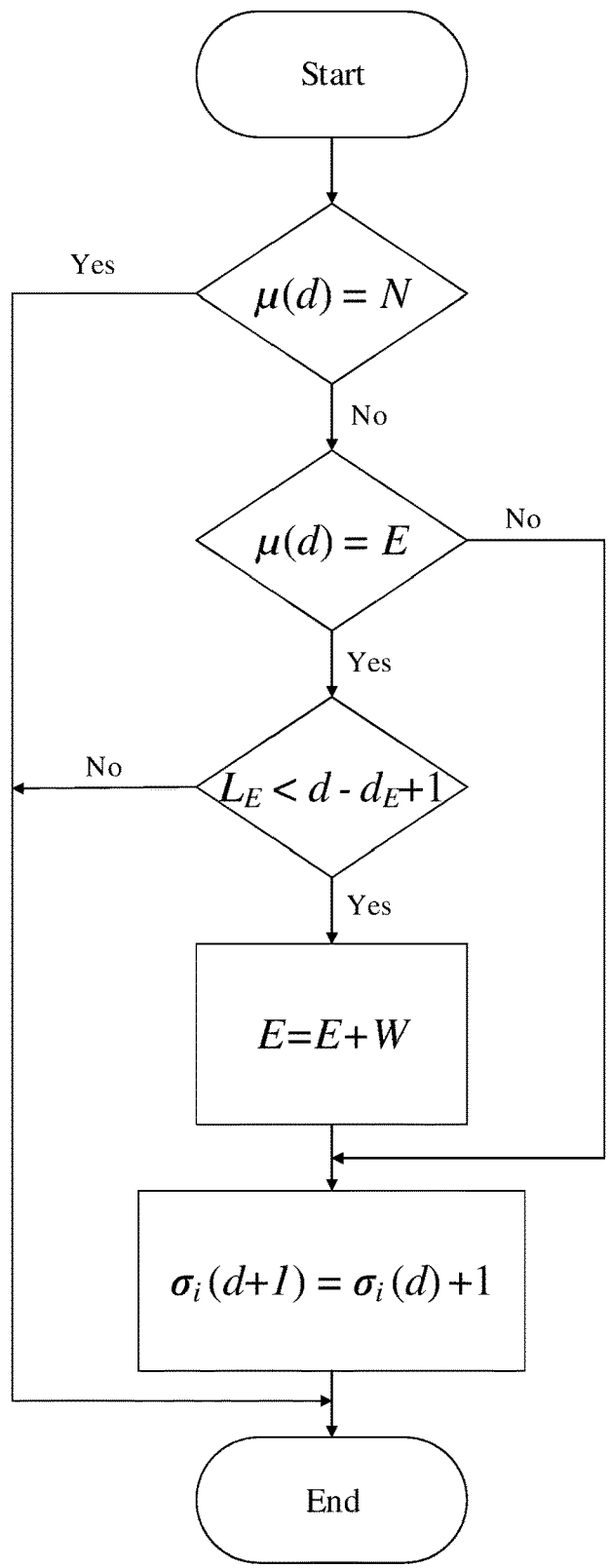
FIG. 17 depicts the increase(i) procedure.

Increase and Decrease Procedures. The increase and decrease procedures are implemented by the scheduler to either raise or reduce the number of videos scheduled for a certain application by one.

increase (i). The procedure increase (i) is described in FIG. 17. The quantity $\mu(d) = \Sigma_{i_{532} \ m(d)} \sigma_i(d)$ captures the total number of adjusted videos on day d. The limit N is the ultimate bound on the total number of these videos. Besides checking the upper bound constraint, the increase procedure is protecting from drift through a stop-and-wait mechanism whereby $\mu(d)$ can be increased until it reaches an edge E, at which it has to be kept for $D_E$ days without increase. Afterwards, if the user is still attaining a high hit ratio, the edge will be extended by a window W and further increments will be enabled. The parameter $L_E$ is the day on which the edge has been reached and is updated dynamically.

decrease (i). This procedure handles the operation of reducing the number of scheduled videos for a certain application by one. To that end, it checks three levels of protection:

1. Total number of scheduled videos on day d+1 must not drop below a factor a>1 of the number of preferred applications by the user. Note that $|m(d+1)|$ is the size of the set of preferred applications on day d+1.
2. A minimum number of days $d_r$ has to elapse after the last reduction. We use $L_r$, to denote the last day on which a successful reduction took place.
3. Reducing the number of videos for any application should guarantee that at least one video from that application is in the new schedule. Thus preventing starvation events.

Figure 18:
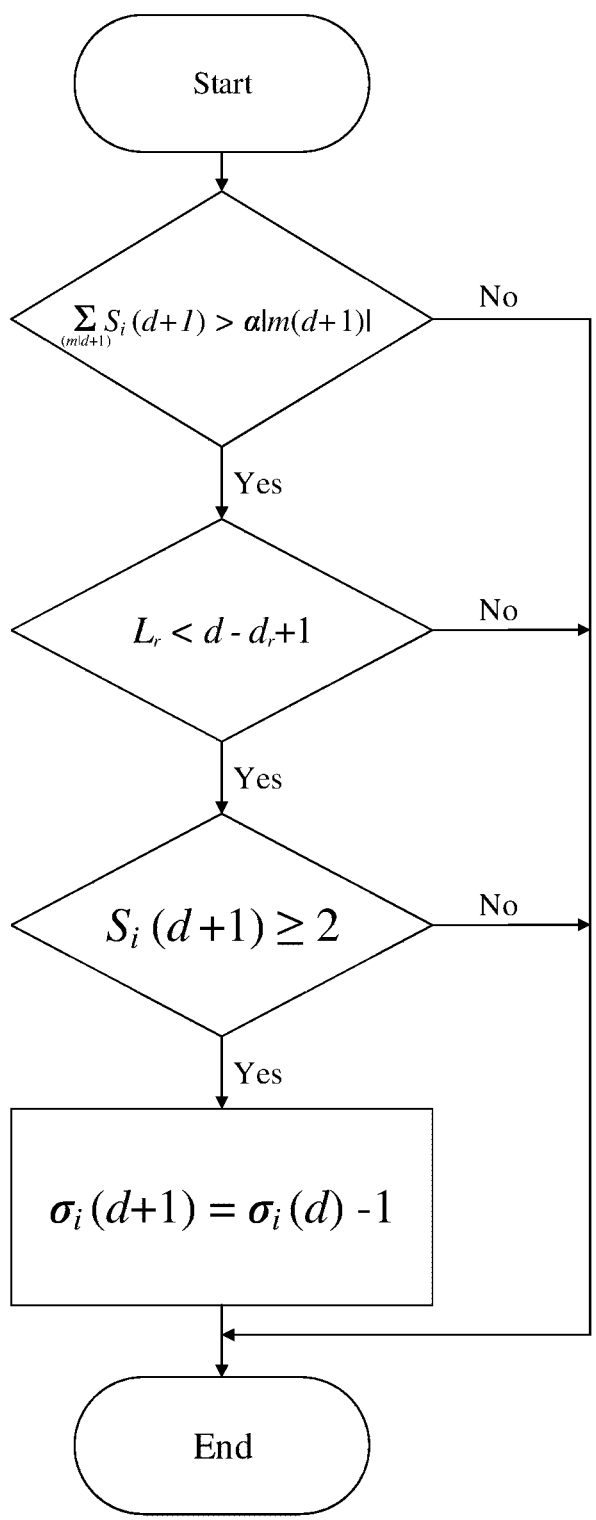
FIG. 18 depicts the decrease(i) procedure.

FIG. 18 depicts a flowchart of the decrease(i) procedure.

Handling ∞ and 0/0 Hit Ratio, and Deactivated Preloading. On operation, the learning module might encounter several applications with 0 delivered videos and positive consumed. According the hit ratio definitions discussed in Section 1 this will result in ∞ hit ratio. To avoid involving infly into the algorithm, we may replace it with the number of consumer videos. Another possibility is a 0/0 hit ratio which means that no consumption because of no delivery. In this case, we would better ignore the statistics of this day for that application.

Finally, if a user has set the "allow preloading" feature to 0, i.e., deactivated proactive services, then an activation reminder is to be sent to him every $d_A$ days.

In some embodiments, the System will transform the mobile device into a personalized mobile Internet portal for the user. Each device will be loaded with content whenever it has access to inexpensive short-range wireless networks connecting it to the Internet (e.g., Wi-Fi or femtocells). In some embodiments, once the device is loaded with content it can also trade its content with its mobile neighbors throughout the day via P2P short-range communication to make sure that it remains refreshed with the most recent personalized content without burdening the more expensive long-range network (e.g., 3G). This way, the supply, in terms of the total available throughput to the user, will scale linearly with the number of users, thereby fundamentally eliminating the bandwidth crunch. The valuable resources of the long-range wireless networks can be more efficiently utilized for more urgent information (e.g., GPS, alerts, news tickers, etc.) and real time communication (e.g., phone or video calls).

Next, one specific embodiment of a system and method is described, wherein the System supports the following functionalities:

1: Monitoring and Reporting: The user behavior in terms of interest in different categories of content, interest in content for particular mobile applications, mobility patterns and access to different mobile networks, utilization of mobile device resources such as battery, memory, and processing power, and consumption of the monthly data plan in addition to roaming activities, is monitored by the application (i.e., software) running on the user's mobile device. The collected data is used to generate reports about different aspects of the user behavior and utilization of resources. These reports are presented to the user in a user interface ("UI") associated with the the System.

2: Profiling: The data collected in the monitoring phase is also used to create a detailed profile for each user which captures the different aspects of behavior that affect the design of the caching/scheduling module(s). In addition to profiling the user, the different content categories as well as the user's mobile applications, are profiled according to their dynamic rate (refresh e.g., how often content available for prefetching is replaced, updated and/or added for each application). In addition, the user's different mobile networks are profiled based on their throughput and congestion characteristics.

3: Caching: Using the profiles developed for the users (mobile devices), content, and mobile networks, the System, particularly the mobile device, will pre-fetch content and store it locally. The pre-fetch schedule is optimized according to multi-objective criteria which allows for offering the highest quality user experience in addition to minimizing the cost associated with monthly data consumption and, in some instances, easing burdens on networks and smoothing traffic (e.g., shifting some traffic to off-peak demand times). The cached content will be available for consumption either through the user interface of the supported mobile application or via the System user interface. Thus, in some embodiments, the same mobile app (e.g., YouTube, Facebook, etc.) is employed by the user to consume prefetched content. The requested content is delivered to the mobile app from cache memory rather than via a real time network connection (which often requires buffering and the resultant delays).

4: Recommendation: The the System user interface allows the user to consume the cached content based on a simple and elegant recommendation interface. In addition, based on the collected statistics regarding the user, content, and mobile networks, a recommendation system allowing the user to change the setting of the caching and data plan usage is included in the UI. The user input is passed, in a parameterized form, to the caching/scheduling module. This way, the user has control on optimizing the usage of the data plan to suit his/her own preferences. In addition to the dynamic setting, the System also supports alert functionalities to aid the user in optimizing the performance platform (e.g., issuing an alert in case of roaming and/or excessive usage of data).

Figure 5:
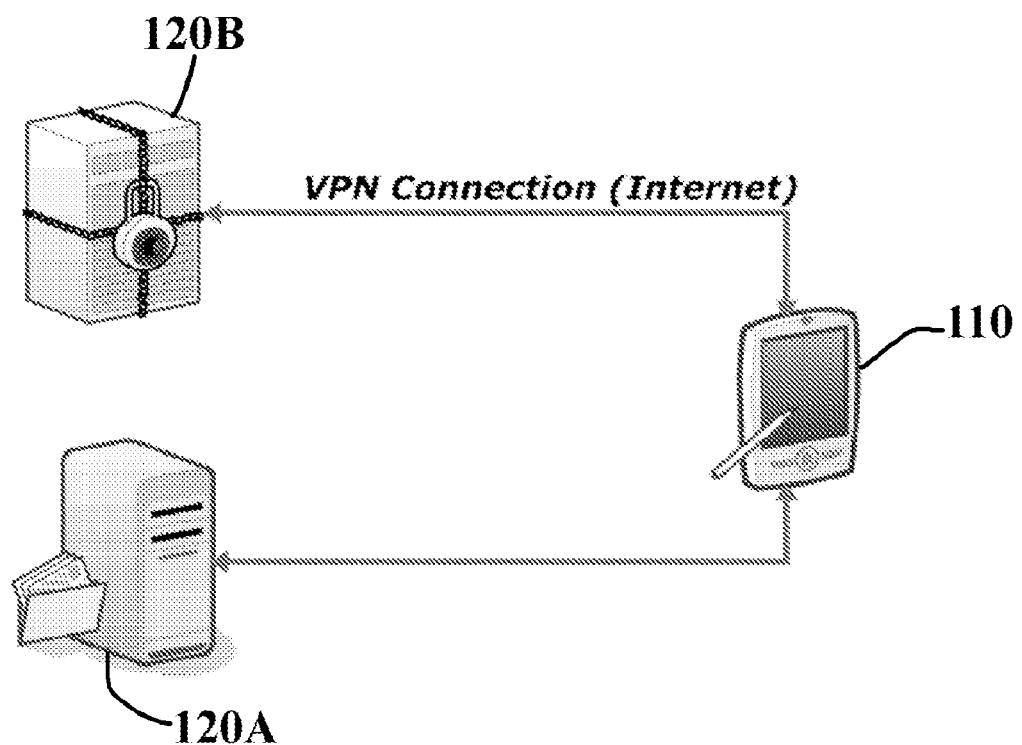
FIG. 5 depicts a schematic illustration of the overall architecture of one particular embodiment of the System.

The overall architecture of a particular embodiment of the System is shown in FIG. 5. In this example of a configuration for the Android® 4 operating system, the System uses the VPN connectivity allowed by the Android® 4 operating system of mobile device (110) to forward the traffic initiated by different mobile applications to the the System's forwarding server (130B). This collected traffic is then used, at the Cloud Server (130A), for building the profiles used to optimize the caching algorithm. It will be understood that forwarding server (130B) may be incorporated into Cloud Server (130A) or omitted entirely. Predicted and recommended content is downloaded by the mobile device and is stored locally on the mobile device (e.g., on an SD-card or other memory store of the mobile device). If/when a certain mobile application, supported by the System, requests a certain item which is available locally, then the request is intercepted (e.g., by the mobile device) and rerouted to the local memory location. The Mobile Application (MA) and Cloud Server (CS) architectures are detailed further herein.

Mobile Application Architecture

Figure 6:
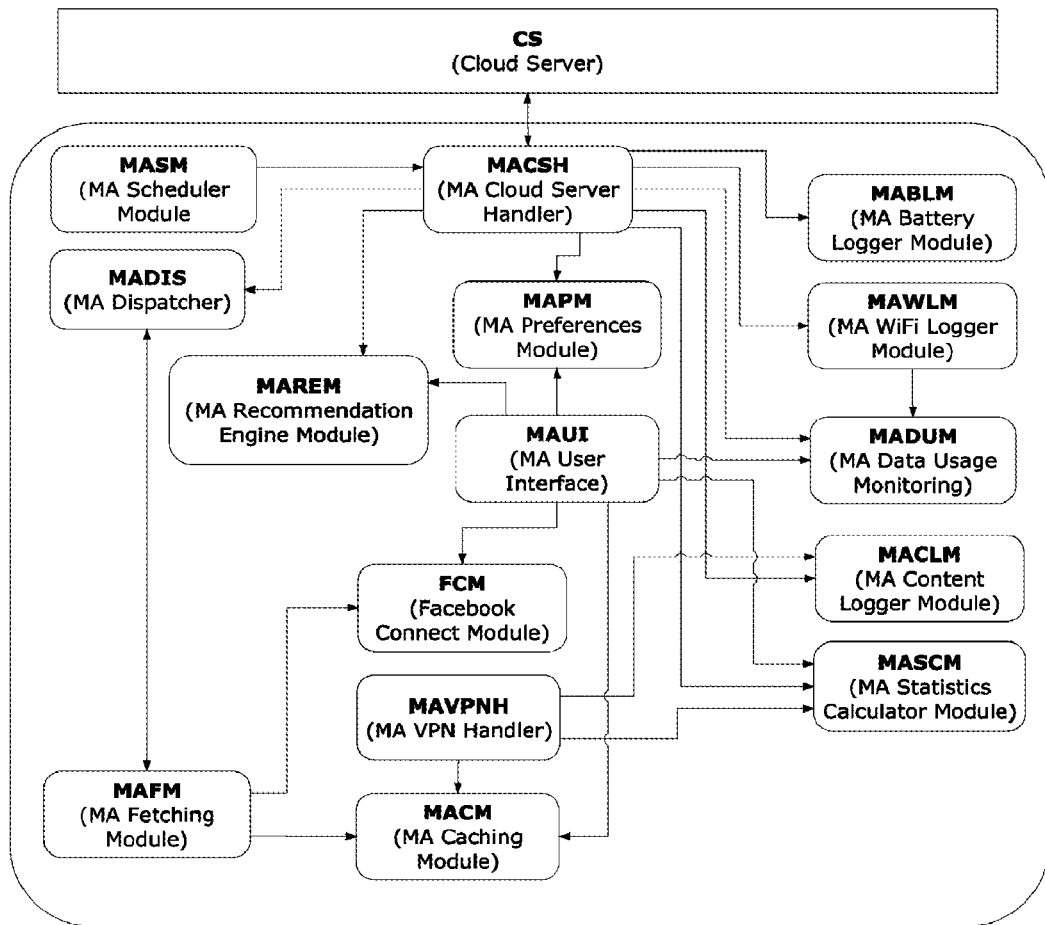
FIG. 6 depicts a block diagram of the MA modules and interfaces, including the interface with the Cloud Server over the network.

The Mobile Application ("MA") generally comprises a software application (which may comprise one or more individual programs, routines and/or subroutines stored in the mobile device memory), and includes a variety of functionalities, various modules which implement these functionalities, and interfaces between these modules. FIG. 6 depicts a block diagram of the MA modules and interfaces, including the interface with the Cloud Server over the network. MA Modules The MA embodiment depicted in the block diagram of FIG. 6 has the following modules:

(1) MA Content Logger Module (MACLM)

This module is responsible for logging the content consumption of the applications traffic. Each time a new HTTP packet arrives to the Cloud Server VPN Handler (described below), it sends the required details to the MACLM to log the requested content. These details include, for example,:
  a. Hostname: www.youtube.com
  b. Get request URL: /watch?v=oI-soTwszFs The MACLM will append the record to the content log file which contains a list of records (lines). Each record contains, for example, the following details:
  a. Application Identifier: it is the hostname provided by the VPN Handler Module.
  b. Logging Time: The time of the content consumption.
  c. Other Parameter: This parameter depends on the content being logged, and will be extracted from the HTTP GET Request URL. Examples for the apps parameter are as follows:
    1. Last.fm: genre/artist
    2. YouTube: video id
    3. CNN: section name (2) MA Battery Logger Module (MABLM)

This module is responsible for logging the battery usage of the device. Each time the device gets a low battery signal, is connected to the charger (USB/AC), is disconnected from the charger, or is in a steady battery state, an Intent is received from the system and the MABLM will append a new battery record to the battery log file. The battery log file contains a list of records (lines), where each record contains, for example, the following details:
  a. Battery State: one of the following states
    1. Connected AC (ac): the device is connected to the AC charger.
    2. Connected USB (usb): the device is connected to the USB charger.
    3. Disconnected (disconn): the device is disconnected from the charger AC/USB.
    4. Battery LOW (batt_low): the device is in low battery state.
    5. Battery OK (batt_ok): the device is above the low battery state and in the stable state.
  b. Logging Time: The time of receiving the Intent.

(3) MA Statistics Calculator Module (MASCM)

This module is responsible for determining the amount of bandwidth ("BW") saved for the user either on 3G or Wi-Fi (in case of Wi-Fi, by reducing the wait time for the video buffering) for each app. The MASCM is divided into two main components: a statistics calculator and a statistics logger:
  a. Statistics Logger: sub-module that logs the amount of BW saved for the apps.
  b. Statistics Calculator: sub-module that is responsible for calculating the amount of BW saved for the user and how much money the user saved.

Each time a cached packet arrives to the MAVPNH, it sends the required details to the Statistics Logger to log the amount of BW saved for each app. These details include:
  1. Hostname: www.cnn.com
  2. Size of data saved (Kbytes): it is the size of the injected packet and its payload.

The Statistics Logger will modify or insert (in the case of the first record of the day) the application recording the statistics log file. This file contains a list of days, each containing a list of application records (lines), where each record contains, for example, the following details:
  1. Application Identifier: it is the hostname provided by the CSVPNH.
  2. BW saved (Kbytes): the size of BW saved by the System.

When the UI needs to display the amount of BW and money saved for the user, it sends a request to the Statistics Calculator where it reads the statistics log file and calculates the amount of BW and money saved for the user, and classifies them according to the user's selected options (today, week, month . . . etc.).

(4) MA WiFi Logger Module (MAWLM)

This module receives connectivity change information to log when the mobile device enters and exits Wi-Fi networks, and calculates bandwidth when the mobile device enters a Wi-Fi network by downloading a specified file on the Cloud Server ("CS") three times in order to calculate the average bandwidth. The CS Handler will send and clear the logs periodically. The MAWLM will also send notification to the Data Usage Monitoring module (MADUM) upon Wi-Fi network enter and exit. For each day of week a Wi-Fi log will be maintained in a separate file, with each file prefixed by day number (0-6). The log file is in plain text format, with fields separated, for example, by the '<' character.

(5) MA App Usage Logger Module (MAAULM)

Some operating systems such as the Android® system provide a way to launch a preference activity in order to display application usage statistics settings for the user.

However, it is often not possible to grab that data for use by the mobile device. The MAAULM is implemented as part of the content logger, and adds date and time records for each content being logged. The data can be aggregated on the CS to deduce application usage statistics.

(6) MA Data Usage Monitoring (MADUM)

The Android® operating system provides network traffic statistics for getting total number of bytes sent/received through the mobile interface or all network interfaces and number of bytes sent/received for a specific application only through all network interfaces since device boot. The MADUM module uses this data together with notifications from the Wi-Fi Logger module (MAWLM) to calculate the number of bytes sent/received for each app through the mobile interface alone on daily basis, and writes the calculated data to log file. It also reads the log file data upon UI request and returns the calculated data grouped by today, last week, or last month. The MADUM is also configured to clear logged data older than one month ago. The MADUM will also disable 3G data altogether once the number of bytes sent/received exceeds a data plan limit set by the user in their preferences. As a result, apps will be restricted to Wi-Fi access only (which will require root access on the mobile device).

(7) MA Preferences Module (MAPM)

This module is responsible for loading and saving user preferences. The UI uses this module to save the preferences after the user finishes modifying them. The MAPM also loads the last saved preferences for the UI. The MACSH (described further herein) will request the last saved preferences from MAPM when those preferences are to be sent to the CS. The format of the file saved will be described further herein. The user-selectable preferences may include, for example:

Should the System cache on Wi-Fi & 3G or Wi-Fi only?
Is the mobile in Roaming mode?
What is the data plan limit?

(8) MA Recommendation Engine Module (MAREM)

This module receives the recommendation survey from the CS Handler, reads questions and answers, and pushes a notification for the user. When the user answers questions in the UI, the MAREM writes user's answers and notifies the Scheduler module (MASM) to send the survey results to the CS through the CS Handler.

(9) MA Dispatcher (MADIS)

This is the module that is responsible for executing the schedule received from the server. In one embodiment, the MADIS is a singleton class which runs in the background. It parses the current schedule, and handles the execution of its tasks. In the exemplary embodiment described herein, each task has two times: a time which the task cannot start before; and a time which the task cannot start after. Each task will also include the type of connectivity to be fetched over (e.g., Any/Wi-Fi Only). At any point of time, a task is executed if and only if both the start time has passed, and the expiration time is yet to come, and the specified connectivity exists. The MADIS parses the schedule, and checks if the next task is ready for execution. If it is not ready, it sleeps until the starting time of the task. If the next task is ready for execution, it executes it and repeats the process for the next task. The task is executed by calling the Fetching Module and passing the task parameters to that module. At any point in time, when the CS handler receives a new schedule, it calls the MADIS to restart dispatching the new schedule. If the MADIS needs to execute a task, but there is no acceptable battery level and/or no connectivity at all, it will sleep in the background until the required battery level is reached and/or any type of connectivity is available. If the MADIS needs to execute a task but there is no acceptable connectivity, it will mark that task as a holding task, and move forward to the next task. If the next task is ready, it will execute it and repeat the process. If, at any point, the scheduler reaches a task that is not due yet, it will stop iterating and sleep until that task is due or until connectivity is available for any of the holding tasks (if any).

(10) MA Caching Module (MACM)

Figure 7:
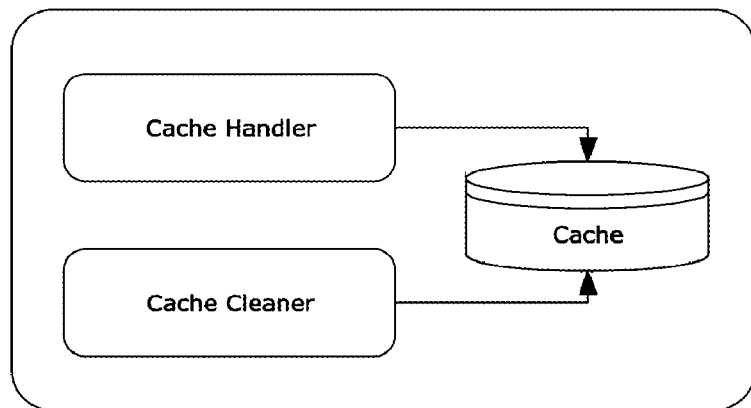
FIG. 7 depicts the three main components of the MA Caching Module (MACM).

This module is responsible for keeping track of cached content; it is divided into three main components, as shown in FIG. 7.

a. Cache Handler: sub-module that handles and keeps track of the cached content wherein each item of cached content has, for example, the following details:
 1. URL: the identifier for the content.
 2. Path: the location of the content on the SD-Card or other memory of the mobile device.
 3. Date: the fetching date of the content.

b. Cache Cleaner: sub-module that is responsible for cleaning the mobile device memory (e.g., the SD-Card) and removing the old and unused content. The cleaning criteria differs from one type of cached content to another, for example:
 1. Last.fm: the playlist of last.fm is cleaned after it is consumed, but the audio files will be cleaned if a new playlist arrives or after a specified time interval.
 2. CNN: the digest of content is cleaned after its consumption as well, but the other files will be cleaned with the new digest or after a specified time interval.
 3. Youtube: the cached videos are cleaned after a specified time interval.

c. Cache: the cached content on the SD-Card (or other memory of the mobile device).

Each time the CSVPNH gets a request, it asks the MACM about the availability of incoming packet request URL. The MACM then searches for the URL in the mobile device memory, and will return the location of the cached content (e.g., its location on the SD-Card). Each time the MAFM starts fetching content it communicates with the MACM to check if the content has been previously cached or not, and the MACM returns the result. After the MAFM finishes the fetching of the content it notifies the MACM of the new content added to the cache and provides the details stated earlier.

(11) MA Fetching Module (MAFM)

Figure 8:
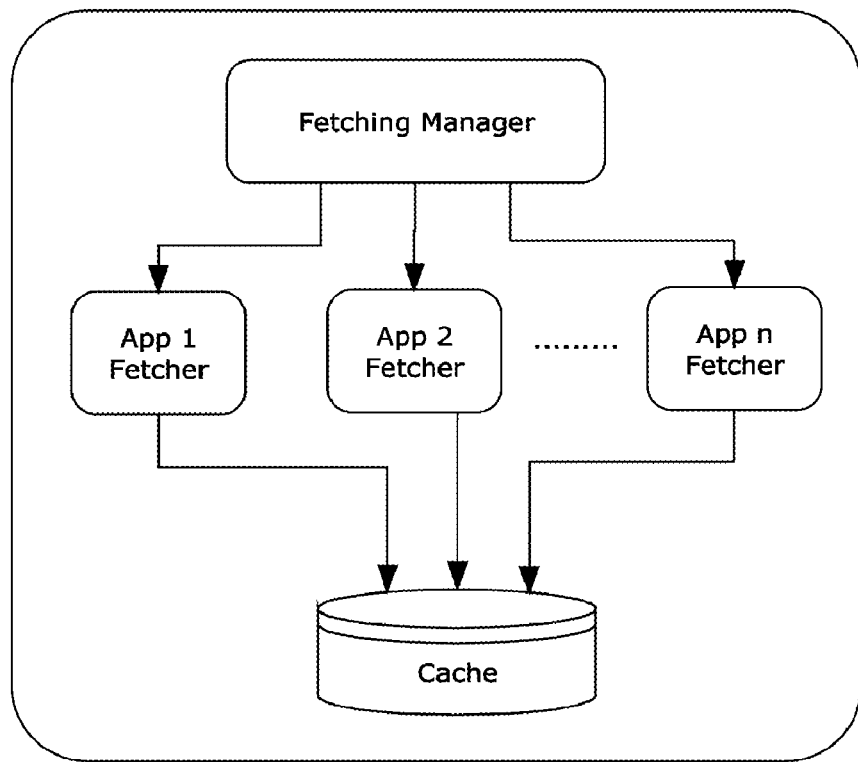
FIG. 8 depicts the three main components of the MA Fetching Module (MAFM)

This module is responsible for caching content to the SD-Card (or other memory store), wherein the MADIS initiates a fetching session by communicating with the MAFM to start fetching the content. Thereafter, the MAFM communicates with the MACM to notify it with the new cached content. The MAFM is divided into three main components, as shown in FIG. 8.

a. Fetching Manager: sub-module that handles the sequence of fetching the content and to manage the fetchers in either a parallel or a sequential manner, it could be represented as queues or sets
b. App Fetchers: sub-module that is responsible for fetching the content and saving it to the SD-Card
c. Cache: the cached content in the SD-Card.

Each time the MADIS finishes parsing the schedule it sends a fetching requests to the Fetching Manager which gives priority to the fetching tasks and starts the appropriate App Fetcher for each task. The App Fetcher communicates with MACM to make sure that this content has not been cached before and then it starts fetching the content according to the application type. Some examples are as follows:

Last.fm Fetcher: is divided into two fetchers
1. Playlist Fetcher: a fetcher that gets the list of audio files that the user will be playing later.
2. Audio Fetcher: a fetcher that fetches the list of audio files in the playlist fetched.
Last.fm Fetcher will need to send to the MACM to notify it with the new cached content for each of the two fetchers.

CNN Fetcher: is divided into two fetchers:
1. Digest Fetcher: a fetcher that sends a request to the CNN servers to get a new digest of content.
2. Content Fetcher: a fetcher to fetch the multimedia files and content of the digest fetched.
CNN Fetcher will need to send to the MACM to notify it with the new cached content for each of the two fetchers.

YouTube Fetcher:
it is responsible for fetching the YouTube videos and sending to the MACM to notify it with the new cached content.

When MAFM finishes fetching all current tasks, it will inform MADIS that no fetching tasks are currently ongoing.

(12) MA Scheduler Module (MASM)

Figure 9:
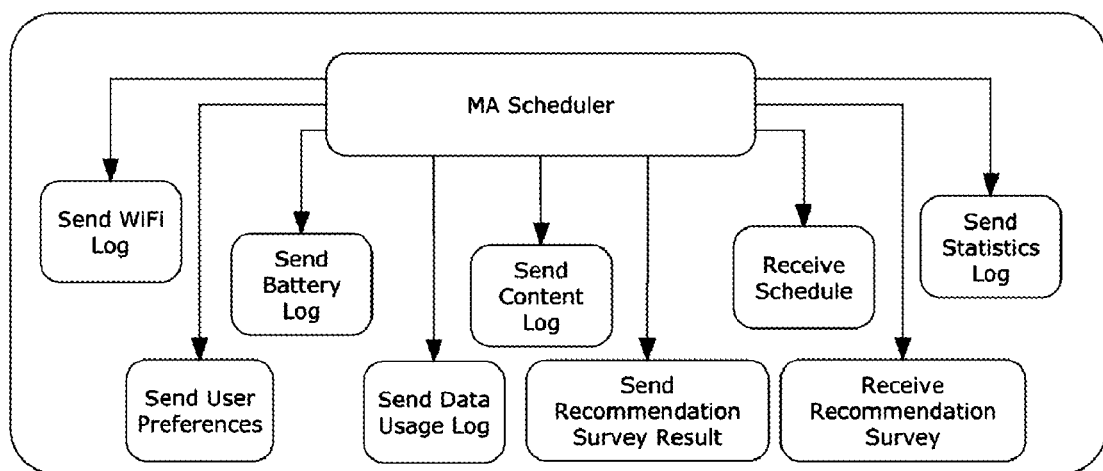
FIG. 9 depicts the ten main components of the MA Schedule Module (MASM).

This module is responsible for scheduling the communication between the MA and the CS, where it asks the MACSH to send the Wi-Fi log, Battery log, Content log, Statistics log, Data Usage log, Recommendation Survey Result, and receive Schedule and Recommendation Survey. The MASM is divided to the 10 main components as shown in FIG. 9.

a. MA Scheduler: sub-module that handles the communication with the CS and handles the timers of the periodical sending and receiving of logs and schedule.
b. Send Wi-Fi Log: sub-module that is responsible for sending the Wi-Fi log to the CS.
c. Send Battery Log: sub-module that is responsible for sending the Battery log to the CS.
d. Send Content Log: sub-module that is responsible for sending the Content log to the CS.
e. Send Statistics Log: sub-module that is responsible for sending the Statistics log to the CS.
f. Send Data Usage Log: sub-module that is responsible for sending the Data Usage log to the CS.
g. Send Recommendation Survey Result: sub-module that is responsible for sending the Recommendation survey result to the CS.
h. Send User Preferences: sub-module that is responsible for sending the preferences of the user.
i. Receive Schedule: sub-module that is responsible for receiving the schedule from the CS.
j. Receive Recommendation Survey: sub-module that is responsible for receiving the Recommendation Survey from the CS.

Each time the timer identifies that it needs to communicate with the CS; it will call the MA Scheduler to start executing the appropriate sender or receiver, which in turn communicates with the MACSH to send the log or receiver the schedule.

(13) Facebook Connect Module (FCM)

This module is responsible for handing the connecting of the user to his/her Facebook account and giving the Facebook fetcher the authorization to access the Facebook news feed to be able to cache the required content. The Facebook SDK written in java is used to connect to Facebook.

(14) MA VPN Handler (MAVPNH)

Figure 10:
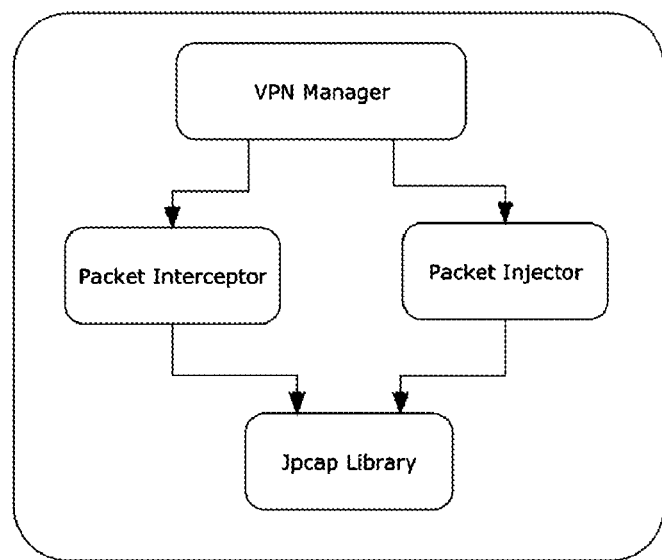
FIG. 10 shows the configuration of the MA VPN Handler (MAVPNH) module.

This is the module that handles VPN connections on the MA, and is configured as shown in FIG. 10. The VPN Manager sub-module extends, for example, the Android® VPN Services class to build a VPN solution; it creates a virtual network interface, configures addresses and routing rules, and returns a file descriptor to the application. Each read from the descriptor retrieves an outgoing packet which was routed to the interface. Each write to the descriptor injects an incoming packet just like it was received from the interface. Reading/Writing from/to the descriptor is performed in parallel. The interface is running on Internet Protocol (IP), so packets always start with IP headers. The application completes a VPN connection by processing and exchanging packets with the remote server over a tunnel. The VPN Manager submodule investigates the packet to determine if it is a TCP Packet and holds HTTP traffic in order to extract and send request method and "Host" HTTP header field from the outgoing packets to the Packet Interceptor sub-module. The VPN Handler module uses the Jpcap library to capture network packets and extends its functionality to generate network packets.

The Packet Interceptor sub-module sends the extracted request method and "Host" HTTP header field to the Content Logger module, and filters using a host-application table before sending the extracted request method and "Host" HTTP header field to the Cache Handler module. In this manner, only the requests for the supported applications are sent to the Cache Handler in order to retrieve cached content for the request, if any. The Package Interceptor sub-module receives the result from the Cache Handler module and forwards it to the VPN sub-module. If there no cached content is found, the VPN manager sub-module writes the outgoing packet to the tunnel. If cached content is found, the VPN manager sub-module drops the outgoing packet and creates a new Packet Injector to handle the loading of the cached content into packet(s).

The Packet Injector handles the breakdown of large cached content (e.g., audio/video files) into packets. The VPN manager sub-module manages handling multiple packet injectors for different cached content requested for different applications at the same time, while reading the incoming packets from the tunnel, and writing all of the previous to the descriptor. The VPN Manager sub-module also keeps track of running packet injectors for different applications, so that if it intercepts a new outgoing packet for an already running application, it will break loading packets for cached content. The Packet Injector also sends the size of loaded cache content to the Statistics Calculator module.

As described above, the VPN Handler module of all user devices sends the HTTP traffic to CSVPNH (described below) for routing. This can be a potential bottleneck of the system. If desired, one way to balance the extra load on the system is for the MAVPNH to interact with a dynamic CSVPNH. Each time the mobile device has a data connection, and before setting up the VPN network, MAVPNH will invoke MACSH to request an IP-Port pair from the CSMAH. The obtained IP-Port pair is then be used for the ongoing connection until it is interrupted. The same process is repeated for any established connection.

(15) MA UI

This is the user interface of the application. It is responsible for displaying the content usage statistics, providing an elegant way for the user to browse through the cached content, collecting the data plan information from the user, suggesting recommended actions for the users, etc..

(16) MA Cloud Server Handler (MACSH)

This is the module that handles all communication with the CS. It sends Wi-Fi, Battery and Content logs periodically to CS, and receives and saves schedules to file, and sends notifications to the Dispatcher module. It also sends bandwidth savings statistics to CS in addition to receiving recommendation surveys from the CS and sending recommendation survey results to CS. In the embodiment shown and described herein, the MACSH is the only module which communicates with the CS. The MACSH also includes a REST client to call REST web services provided by the CS. Requests and responses are sent and received in JSON format, and data is sent/received as value of "data" parameter name.

Cloud Server (CS) Architecture

Figure 11:
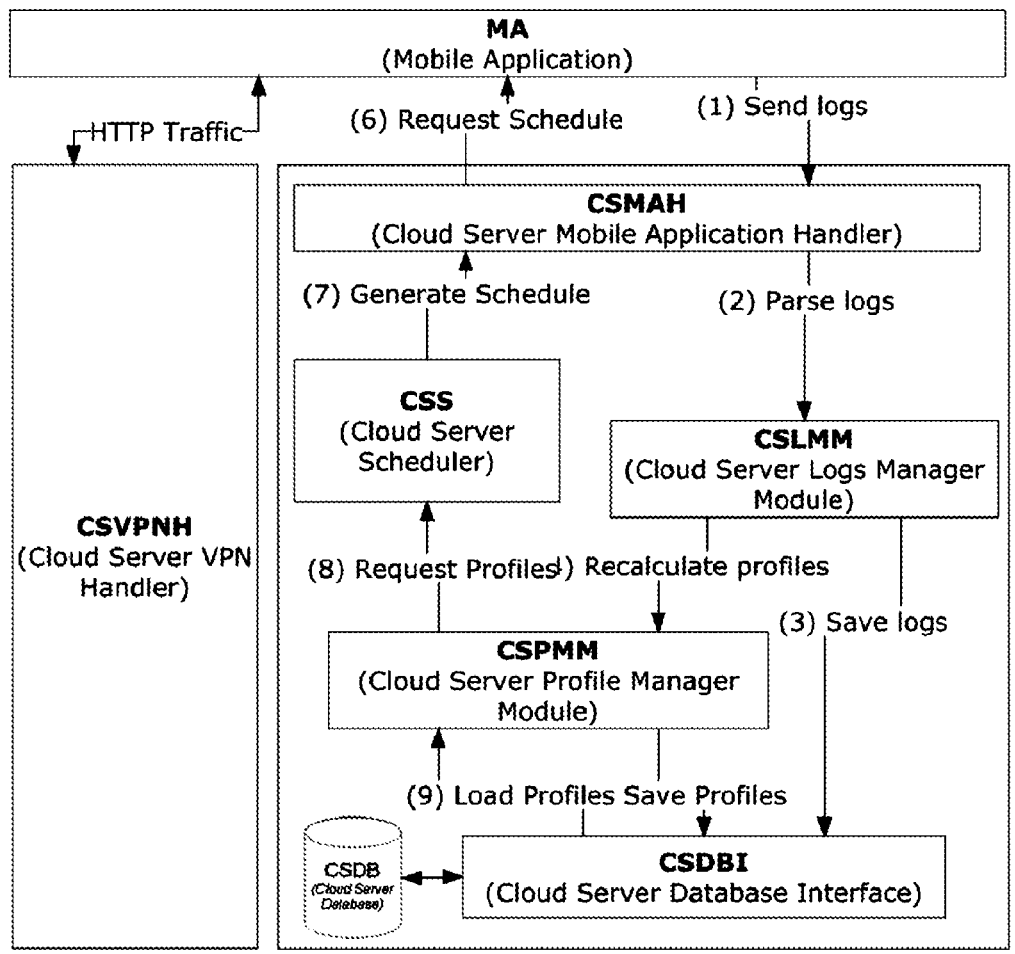
FIG. 11 is a block diagram depicting an exemplary CS configuration and its communications with the Mobile Application.

This section describes the architecture of one embodiment of the Cloud Server ("CS"), including its modules, the interfaces between these modules, and the sequence of operations that are performed by such modules. FIG. 11 is a block diagram depicting an exemplary CS configuration and its communications with the Mobile Application.

CS Modules (1) CS VPN Handler (CSVPNH)

This is the module that handles VPN connection on the CS. The CSVPNH forwards IP packets received/sent from/to the MA through a created tunnel. It handles multiple sessions at a time and performs simple authentication using device ID. No packet investigation is done at this stage. A dedicated machine (or multiple machines) is provided for forwarding in order to optimize performance. As described for the MAVPNH, one approach for solving any performance issues that might arise is to have multiple instances of the CSVPNH. The CSMAH will request an IP-Port pair from the CSLBM, and the IP-Port pair is then be used for the ongoing connection until interrupted. (It should be noted that the CSLBM is not depicted in FIG. 7 above.)

(2) CS Mobile Application Handler (CSMAH)

This is the module that handles all communication with the MA. It receives Wi-Fi, battery and content logs, and sends logs to Logs Manager module. The CSMAH also retrieves schedule from the CSSM and sends schedules to the MA upon request. It also receives bandwidth savings statistics and data usage logs from the MA, and sends statistics and data usage logs to CSLMM. The CSMAH also sends recommendation surveys to the MA upon request, and receives recommendation survey results from the MA. In the exemplary embodiment shown, no other module in the CS communicates with the MA except the CSMAH. The CSMAH uses a web framework to provide REST web services. Requests and responses are sent/received in JSON format, and data is sent/received as value of "data" parameter name.

(3) CS Load Balancing Module (CSLBM)

This module, if provided, is responsible for balancing loads when there are multiple instances of the CSVPNH. The MA will request an IP-Port pair for the CSVPNH each time it establishes a 3G connection. The CSMAH will forward that request to the CSLBM, which will monitor how many connections each CSVPNH instance is currently handling. The CSLBM will respond to the request with the IP-Port pair of the CSVPNH with acceptable load. The algorithm used in this module can be relatively simple, or more complex depending upon the estimated performance of a single CSVPNH instance.

(4) CS Logs Manager Module (CSLMM)

This module is responsible for saving/loading the logs to/from the Cloud Server Database ("CSDB"). The CSLMM is invoked when the MA handler sends a new log in order to save the new log to the CSDB. The CSLMM also invokes the CSPMM providing previous logs to re-generate the profiles. The CSLMM includes several sub-modules:

a. Content Logs Manager Module

This sub-module is responsible for saving/loading content logs to/from database. The input file received from CSMAH to be saved in the database will be formatted as described further herein. The sub-module will parse the file, create a new day record in the database tables, and insert the records as rows. After saving the new logs to the database, it will invoke the CSPMM providing previous content logs. The CSPMM will use this data to update the content profiles.

b. WiFi Logs Manager Module

This sub-module is responsible for saving/loading Wi-Fi logs to/from database. The input file received from CSMAH to be saved in the database will be formatted as described further herein. The sub-module will parse the file, create a new day record in the database tables, and insert the records as rows. After saving the new logs to the database, it will invoke the CSPMM providing previous Wi-Fi logs. The CSPMM will use this data to re-generate the connectivity profiles.

c. Battery Logs Manager Module

This sub-module is responsible for saving/loading battery logs to/from database. The input file to be saved in the database will be formatted as described further herein. The sub-module will parse the file, and insert the records as rows. After saving the new logs to the database, it will invoke the CSPMM providing previous battery logs. The CSPMM will use this data to re-generate the battery profiles.

d. Statistics Logs Manager Module

This sub-module is responsible for saving/loading statistics logs to/from database. The input file to be saved in the database will be formatted as further described herein. The sub-module will parse the file, and insert the records as rows. After saving the new logs to the database, it will invoke CSPMM providing previous battery logs. The CSPMM will use this data to re-generate the traffic statistics profiles.

e. Dataplan Logs Manager Module

This sub-module is responsible for saving/loading data plan logs to/from database. The input file to be saved in the database will be formatted as further described herein. The sub-module will parse the file and insert the records as rows. After saving the new log to the database, it will invoke CSPMM providing previous data plan logs. The CSPMM will use this data to re-generate the data plan profiles.

f. Recommendation Survey Manager Module

This sub-module is responsible for loading recommendation survey question from database, and also saving/loading recommendation survey answers to/from database. The input file to be saved in the database will be formatted as further described herein. The sub-module will parse the answers file and insert the answers in the database. This module will be invoked by CSSM to reflect the survey answers into the scheduling decisions.

g. User Preferences Manager Module

This sub-module is responsible for saving/loading data plan logs to/from database. The input file to be saved in the database will be formatted as further described herein. The sub-module will parse the file and update the user preferences in the database. The CSSM will get the user preferences from this sub-module to reflect it in the resulting schedule.

(5) CS Profile Manager Module (CSPMM)

The CSPMM includes a number of components:

a. Profiles Manager

This is a sub-module which is responsible for saving and loading the user profiles. It saves the profiles generated by the rest of the sub-modules of CSPMM, and loads the profiles requested by the CS SM.

b. Content Profile

This is a content requests profiler where records are more structured. The input to this sub-module will be the content log array returned from the CSLMM. Some statistics are calculated such as the minimum (earliest) and maximum (latest) times that this request has been made throughout multiple weeks of a specific day (e.g., the latest time the request to content X has been made during the last five Sundays), the average time of all the requests made by a certain application ID to a certain category, and the priority of this request (application profiler). Each application request is used to compute the priority of this application ID for later use in the scheduler. A reference count for each application ID is calculated. This count reflects the number of requests made by this application. A high reference count means that this application is demanded more frequently than others, increasing the priority of this application. The average request time will be used for scheduling the task at the right time and the maximum (latest) time will be used as an expiry date c. Wi-Fi Profiler This component is responsible for profiling the Wi-Fi log files. The input to this sub-module will be the Wi-Fi log array returned from CSLMM. This profiler provides two mechanisms for representing Wi-Fi logs: a daily mechanism which deals with all log records as daily records which means that all entities are combined into one single 24 hour day; and a weekly mechanism which deals with log records as separate days thus combined in a longer period of 7 days.

d. Battery Profiler

This component is responsible for estimating the charging and the discharging times. The input to this module will be the battery log array returned from the CSLMM. This information will be used later in the scheduler. The discharging period (battery low) will be reflected as no Wi-Fi periods in the BW density function. For example whenever a battery low period is found, this will be reflected on the estimated available BW as no available BW to decrease the priority (or even prevent) scheduling tasks at this period of time.

e. Dataplan Profiler

This component is responsible for estimating the data plan usages of the user. The input to this sub-module will be the data plan log array returned from the CSLMM. This information will be used later in the scheduler. The data plan profile will be reflected in scheduling affecting whether to cache content via 3G or not. The current data usage along with the data plan limit is used for that decision.

f. Bandwidth Modeler

This component creates the BW Density function. It provides means to get the contributing Wi-Fi entities in each point and their corresponding BW values. A point in the BW density function can be obtained by accumulating the BW of all the Wi-Fi entities that contributes in this specific time slot (if any) from different weeks on a certain day. For example point X in time has a BW value of the average of all Wi-Fi entities found during this time X from the last five Sundays. If there is no Wi-Fi during certain period a value of zero will be used instead.

(6) CS Scheduler Module (CSSM)

This module is optimized according to a multi-objective criterion that takes into account the profiles of the user, content, and mobile network. It also takes input from the dynamic setting (recommendation) functionality supported by the UI. The resulting schedule will be sent to the mobile unit to execute (7) CS Database Interface (CSDBI)

Figure 12:
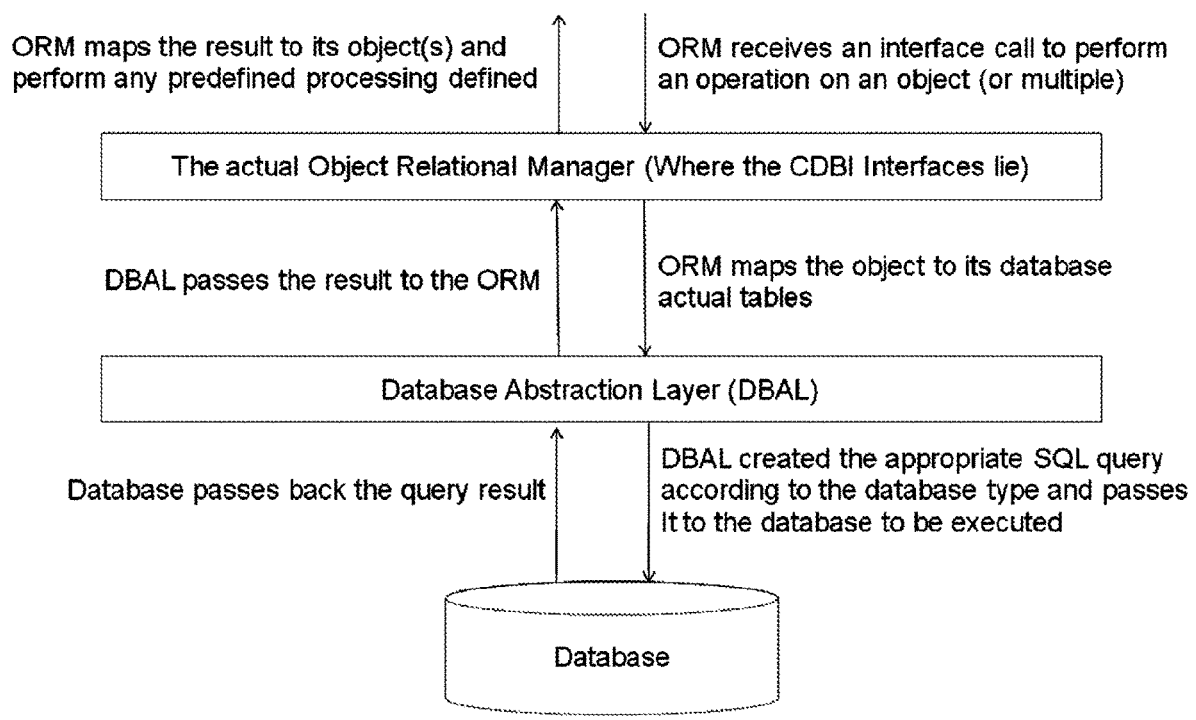
FIG. 12 sets forth the architecture of the Object Relational Mapping (ORM) design pattern for handling queries and operations performed against the CS database (CSDB).

This module is responsible for mapping and abstracting the database server in the CS. It uses an Object Relational Mapping (ORM) design pattern to handle all queries and operations performed against the CS database (CSDB). This means there are two layers. The first layer is the Database Abstraction Layer (DBAL) which allows one to plug in any supported database type without the need to rewrite all the code or queries. The second layer maps database tables into objects in both directions, i.e., it retrieves data from the database in form of objects, and when told to save data maps back the object to its original table(s) in the database. The ORM Architecture is further explained by FIG. 12.

Cloud Server Operations Sequence (1) Saving Logs Operation Sequence

CS MobileApplication Handler (CSMAH) Operation: Once a day, the MA will send the Wi-Fi logs, battery logs, and content logs to the CS. The CSMA will accept the files and pass them to CS Logs Manager Module (CSLMM).

CS Logs Manager Module (CSLMM) Operation: The CSLMM will parse the log files received, and save the parsed data to the CSDB. It will also load the logs of the previous weeks and pass them to the CSPMM to update the user profiles.

CS Profiles Manager Module (CSPMM) Operation: The CSPMM will be invoked by the CSLMM to update the user profiles. It will generate the new profiles, and save them to the database.

(2) Requesting Schedule Operation Sequence

CS Mobile Application Handler (CSMAH) Operation: Once a day, the MA will request a new schedule from the CS. The CSMA will accept the request, invoke the CS Scheduler (CSS), and send the resulting file.

CS Schedule Module (CSSM) Operation: The scheduler will generate the schedule on the fly and return it to CSMAH. In order to generate the schedule, it will need the profiles. So, it will request the latest user profiles from CSPMM.

CS Profile Manager Module (CSPMM) Operation: The Profiles Manager submodule will load the latest user profiles from the database into objects and return them to CSSM.

Cloud Server (CS)-Mobile Application (MA) Interfaces

The CS offers an API that allows the MA to call methods that respond in REST style JSON. Individual methods are detailed in the tables below.

| ID | Web Service Name | Description |
|---|---|---|
| 1 | Register | Registers a user's device id |
| 2 | Send Wi-Fi Log | Sends user's Wi-Fi logs |
| 3 | Send Battery Log | Send user's battery logs |
| 4 | Send Content Log | Send user's traffic content logs |
| 5 | Fetch Schedule | Retrieve user's caching schedule |
| 6 | Send Statistics | Send user's bandwidth saving statistics |
| 7 | Send Data Usage | Send user's traffic usage statistics |
| 8 | Fetch Recommendation Survey | Retrieve user's recommendation survey |
| 9 | Send Recommendation Survey Result | Send user's recommendation survey result |
| 10 | Request CSVPNH | Request an IP-Port pair for CSVPN instance |
| 11 | Send Preferences | Send user's preferences |

MA InterfacesRegisterWebservice

| | |
|---|---|
| Request | Request http://[hostname:port]/register |
| Method | Post |
| Request | Json Object containing: device_id |
| Response | No response |
| Response code | 200: operation done successfully |
| | 410: unknown server error |
| | 420: database error |
| | 440: parameters format error |
| Request Ex: | {'device_id':'3a302cbe-7772-381e-a66c-5307ddalf517'} |
| Response Ex: | { } |

Send WiFi Log Webservice

| | |
|---|---|
| Request | Request http://[hostname:port]/send_wifi_log |
| Method | Post |
| Request | Json Object containing: device_id and data (See Wifi Log File Format) |
| Response | No response |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517','data':'See Wifi Log File Format'} |
| Response Ex: | { } |

Send Battery Log Webservice

| | |
|---|---|
| Request | Request http://[hostname:port]/send_battery_log |
| Method | Post |
| Request | Json Object containing: device_id and data (See Battery Log File Format) |
| Response | No response |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517','data':'See Battery Log File Format'} |
| Request Ex: | { } |

Send Content Log Webservice

| | |
|---|---|
| Request | Request http://[hostname:port]/send_content_log |
| Method | Post |
| Request | Json Object containing: device_id and data (See Content Log File Format) |
| Response | No response |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517','data':'See Content Log File Format'} |
| Response Ex: | { } |

Fetch Schedule Webservice

| | |
|---|---|
| Request Method | Request http://[hostname:port]/fetch_schedule |
| | Post |
| Request | Json Object containing: device_id |
| Response | Json Object containg schedule |
| Response code | 200: operation done successfully |
| | 210: empty result |
| | 410: unknown server error |
| | 420: database error |
| | 430: authentication device_id |
| | 440: parameters format error |
| Request Ex: | {'device_id':'3a302cbe-7772-381e-a66c-5307dda1f517'} |
| Response Ex: | {'data':'See Schedule File Format'} |

Send Statistics Webservice

| | |
|---|---|
| Request Method | Request http://[hostname:port] send_statistics |
| | Post |
| Request | Request Json Object containing: device_id and data (See Statistics File Format) |
| Response | No response |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517','data':'See Statistics File Format'} |
| Response Ex: | { } |

Send Data Usage Webservice

| | |
|---|---|
| Request Method | Request http://[hostname:port] send_data_usage |
| | Post |
| Request | Request Json Object containing: device_id and data (see Data Usage File Format) |
| Response | No response |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517','data':' see Data Usage File Format'} |
| Response Ex: | { } |

Fetch Recommendation Survey Webservice

| | |
|---|---|
| Request Method | Request http://[hostname:port] fetch_recommendation_survey |
| | Post |
| Request | Request Json Object containing: device_id |
| Response | Response Json Object containing: data (See Recommendation Survey File Format) |
| Response code | 200: operation done successfully |
| | 410: unknown server error |
| | 420: database error |
| | 430: authentication device_id |
| | 440: parameters format error |
| Request Ex: | {'device_id':'3a302cbe-7772-381e-a66c-5307dda1f517'} |
| Response Ex: | {'data':'See Data Usage File Format'} |

Send Recommendation Survey Result Webservice

| | |
|---|---|
| Request | Request http://[hostname:port] send_recommendation_survey_result |
| Method | Post |
| Request | Request Json Object containing: device_id and data |
| Response | No response |

| | |
|---|---|
| Response code | 200: operation done successfully<br>410: unknown server error<br>420: database error<br>430: authentication device_id<br>440: parameters format error |
| Request Ex: | {'device id':'3a302cbe-7772-381e-a66c-5307dda1f517','data':'See Recommendation Survey Result File Format'} |
| Response Ex: | { } |

Request CSVPNHWebservice (send statistics webservice)

| | |
|---|---|
| Request Method | Request http://[hostname:port] get csvpnh<br>Post |
| Request | Request Json Object containing: device_id |
| Response | Json Object Containg IP-Port pair |
| Response code | 200: operation done successfully<br>410: unknown server error<br>420: database error<br>430: authentication device id<br>440: parameters format error |
| Request Ex: | {'device_id':'3a302cbe-7772-381e-a66c-5307ddalf517'} |
| Response Ex: | {'IP':'70:38:54:17','Port':'2050'} |

SendPreferencesWebservice

| | |
|---|---|
| Request Method | Request http://[hostname:portl send_preferences<br>Post |
| Request | Request Json Object containing: device_id and data (see preferences file format Fig. 19) |
| Response | No response |
| Response code | 200: operation done successfully<br>410: unknown server error<br>420: database error<br>430: authentication device_id<br>440: parameters format error |
| Request Ex: | {'device_id':'3a302cbe-7772-381e-a66c-5307ddalf517','data':'See Preferences File Format'} |
| Response Ex: | { } |

Exemplary XML File Formats

Some exemplary XML file formats used in the system and method described herein are provided below.

Wi-Fi Logger

This is the file sent from MA to CS that contains the user's Wi-Fi logs.

```
Format
  State<Day<Date<Time<Bandwidth<Name
  ENTER/EXIT<EEEE<yyyy-MM-dd<HH:mm<WiFi Network
  Bandwidth<WiFi Network Name
Example:
  ENTER<Saturday<2012-03-24<14:55<512<inmobly2
  EXIT<Saturday<2012-03-24<15:10<512<inmobly2
```

Content Logger

This is the file sent from MA to CS that contains the user's content logs.

```
Format
  Host<Day<Date<Time<Other parameter
  Host<EEEE<yyyy-MM-dd<HH:mm<Other parameter
Example:
  lastfm.com<Friday<2012-03-23<14:55<Rock
  youtube.com<Friday<2012-03-23<14:55<oI-soTwszFs
```

-continued

```
  cnn.com<Friday<2012-03-23<14:55<sports
  unknown.com<Friday<2012-03-23<14:55<NA
```

Battery Logger

This is the file sent from MA to CS that contains the user's battery logs.

```
Format
  State<Day<Date<Time
  State<EEEE<yyyy-MM-dd<HH:mm
```

```
Example:
  (ac/usb/disconn/batt_low/batt_ok)<Friday<2012-03-23<14:55
```

Statistics Logger

This is the file sent from MA to CS that contains the user's traffic statistics logs.

```
Format
  #dd-MM-YYYY
  Host<Size(KB)
Example:
  #25-01-2011
  lastfm.com<125024
  youtube.com<5023412
  cnn.com<2304
```

Data Usage Logger

This is the file sent from MA to CS that contains the user's traffic data usage logs.

```
Format
  #dd-MM-YYYY
  Package<Sent Size(KB)<Receive Size(KB)
Example:
```

-continued

```
#25-01-2011
Com.facebook.android<536<8503453
com.google.android.youtube<2356<943025834
```

Recommendation Survey Logger

This is the file sent from MA to CS that contains the user's recommendation survey

```
Format
Question ID<Question Text
Answer 1 ID:Answer 1 Text<Answer 2 ID:Answer 2 Text
Example:
148<Do you prefer to cache Facebook videos? :2: No
1:Yes<2:No
```

Recommendation Survey Result Logger

This is the file sent from MA to CS that contains the user's recommendation survey result

```
Format
Question ID<Selected Answer ID
Example:
148<2
```

Preferences

This is the file sent from MA to CS that contains the user's preferences.

```
Format
wifi-only(0)/wifi-and-3g(1)<no-roaming(0)/roaming (1)<data-plan-limit(in MB)
Example:
0<1<2000
```

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required.

The invention claimed is:

1. A system for optimizing the use of network bandwidth by a mobile device comprising:
a mobile application client residing on the mobile device and connected to a cloud server via a network, the mobile application client comprising:
a mobile application content logger module that logs an application identifier, a logging time, and a content parameter for content requests to a content log, and
a mobile application connectivity logger module that logs a first network connection status at a first time and a second network connection status at a second time, wherein the second time is after the first time,
wherein the system analyzes, based on the content log, content consumption by a user of the mobile device to create a user profile of a user associated with the mobile device, the system compiles a prefetching schedule of content anticipated to be requested based on the user profile, the user profile including data reflecting (i) at least a portion of the content log and (ii) the first network connection status and the second network connection status, and
wherein the mobile application client provides the prefetching schedule to the mobile device, and wherein the mobile device prefetches content at least partially in accordance with the prefetching schedule.

2. The system of claim 1, wherein the prefetched content includes posts from third parties.

3. The system of claim 2, wherein the cloud server is associated with a social networking site and wherein the posts from third parties are posted to the social networking site.

4. The system of claim 2, wherein the posts from third parties include video content.

5. The system of claim 2, wherein at least one of the posts from third parties contains a universal resource locator corresponding to additional content, and wherein the prefetched content includes the additional content.

6. The system of claim 1, wherein traffic requests at the mobile device are intercepted and analyzed to determine if requested content is available in a local memory of the mobile device.

7. The system of claim 6, wherein, responsive to determining that the requested content is available in the local memory, the traffic requests are rerouted to the local memory instead of to the cloud server.

8. The system of claim 6, wherein, if the requested content is not available in the local memory, the traffic requests are forwarded to a predefined destination.

9. The system of claim 1, wherein the user's preferences in different content types are stored in content log files at the cloud server and/or the mobile application client.

10. The system of claim 1, wherein a mobility pattern of the user and access to different mobile networks by the user is stored in a log file.

11. The system of claim 1, wherein the mobile application client further comprises a mobile application statistics calculator module calculating an amount of bandwidth saved and a mobile application data usage monitoring module to log a number of bytes sent and/or received by the mobile application client.

12. The system of claim 1, wherein a current network resource of the mobile device indicates the mobile device is connected to a short-distance network.

13. The system of claim 1, wherein the mobile device prefetches content to provide an optimized quality of service based at least in part upon a current network connection status.

14. The system of claim 1, wherein the prefetching schedule is compiled by the cloud server and sent to the mobile application client.

15. The system of claim 1, wherein the prefetching schedule contains a priority for each item in the prefetching schedule and a specific condition under which each item in the prefetching schedule is to be cached.

16. The system of claim 1, wherein the prefetching schedule is executed by a dedicated module of the mobile application client.

17. The system of claim 1, wherein the system provides reports regarding at least one of (i) user behavior of the user and (ii) utilization of resources of the mobile device.

18. The system of claim 1, wherein the system provides reports based at least in part on the prefetched content.

19. The system of claim 1, wherein the system provides the user with settings to control certain parameters of the prefetching of the content.

20. A method of optimizing the use of network bandwidth by a mobile device, comprising:

logging an application identifier, a logging time, and a content parameter for content requests to a content log;

logging a first network connection status of the mobile device at a first time and a second network connection status of the mobile device at a second time, wherein the second time is after the first time;

analyzing, based on the content log, content consumption by a user of the mobile device to create a user profile of a user associated with the mobile device, the user profile including data reflecting (i) at least a portion of the content log and (ii) the first network connection status and the second network connection status;

compiling a prefetching schedule of content anticipated to be requested based on the user profile; and prefetching content at least partially in accordance with the prefetching schedule.

* * * * *